(12) United States Patent
Sadow et al.

(10) Patent No.: US 10,919,989 B2
(45) Date of Patent: Feb. 16, 2021

(54) END GROUP FUNCTIONALIZATION AGENTS FOR POLYDIENE

(71) Applicants: Iowa State University Research Foundation, Inc., Ames, IA (US); Kumho Petrochemical, Seoul (KR)

(72) Inventors: Aaron David Sadow, Ames, IA (US); Bradley M. Schmidt, Ames, IA (US); Gwanghoon Kwag, Daejeon (KR); Hanbaek Lee, Daejeon (KR); Dong Eun Kang, Daejeon (KR)

(73) Assignees: IOWA STATE UNIVERSITY RESEARCH FOUNDATION, INC., Ames, IA (US); KUMHO PETROCHEMICAL, Seoul (KR)

(*) Notice: Subject to any disclaimer, the term of this patent is extended or adjusted under 35 U.S.C. 154(b) by 131 days.

(21) Appl. No.: 16/166,939

(22) Filed: Oct. 22, 2018

(65) Prior Publication Data

US 2019/0119409 A1 Apr. 25, 2019

Related U.S. Application Data

(60) Provisional application No. 62/574,963, filed on Oct. 20, 2017.

(51) Int. Cl.
*C08C 19/44* (2006.01)
*C08C 19/25* (2006.01)
(Continued)

(52) U.S. Cl.
CPC .............. *C08C 19/25* (2013.01); *C08C 19/44* (2013.01); *C08F 136/06* (2013.01);
(Continued)

(58) Field of Classification Search
None
See application file for complete search history.

(56) References Cited

U.S. PATENT DOCUMENTS 2,671,100 A * 3/1954 Frisch ............... C07F 7/1896
556/431
2,671,101 A * 3/1954 Frisch ............... C07F 7/1896
556/442
(Continued)

FOREIGN PATENT DOCUMENTS

EP  1479698 A1  11/2004
JP  62227912 A * 10/1987 ............ C08F 236/10
(Continued)

OTHER PUBLICATIONS

Machine translation of JPH01272610, 18 pages, translation generated Nov. 2019. (Year: 2019).*
(Continued)

*Primary Examiner* — Robert S Loewe
(74) *Attorney, Agent, or Firm* — Troutman Pepper Hamilton Sanders LLP (Rochester)

(57) ABSTRACT

The present invention relates to a modified polymer having the structure of Formula (I) and Formula (IV):

wherein A, (Continued)

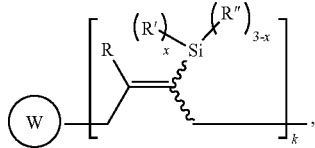

$R^1$, $R^2$, $R^3$, a, and n are as described herein and (IV)

wherein

R, R', R", x, and k are as described herein and methods for preparation thereof. The present invention also relates to a compound having the structure of Formula (II):

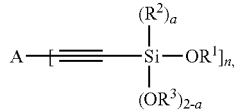

wherein A, $R^1$, $R^2$, $R^3$, a, and n are as described herein. The present invention also relates to a process for polymerizing unsaturated hydrocarbon monomers.

31 Claims, 12 Drawing Sheets

(51) Int. Cl.

| | | |
|---|---|---|
| C08F 236/08 | (2006.01) | |
| C08F 236/06 | (2006.01) | |
| C08L 19/00 | (2006.01) | |
| C08K 3/04 | (2006.01) | |
| C08K 3/36 | (2006.01) | |
| C08L 7/00 | (2006.01) | |
| C08F 136/06 | (2006.01) | |
| C08F 136/08 | (2006.01) | |
| C08L 9/06 | (2006.01) | |
| C08F 4/58 | (2006.01) | |
| C08F 4/48 | (2006.01) | |

(52) U.S. Cl.
CPC .......... *C08F 136/08* (2013.01); *C08F 236/06* (2013.01); *C08F 236/08* (2013.01); *C08K 3/04* (2013.01); *C08K 3/36* (2013.01); *C08L 7/00* (2013.01); *C08L 9/06* (2013.01); *C08L 19/006* (2013.01); *C08F 4/48* (2013.01); *C08F 4/58* (2013.01); *C08F 2810/40* (2013.01)

(56) References Cited

U.S. PATENT DOCUMENTS

| | | | | |
|---|---|---|---|---|
| 4,730,031 | A * | 3/1988 | Sato | C08F 36/14 526/173 |
| 5,686,371 | A * | 11/1997 | Ansell | C08F 36/04 502/102 |
| 5,902,856 | A * | 5/1999 | Suzuki | C08C 19/42 525/237 |
| 6,696,518 | B1 * | 2/2004 | Dersch | C08C 19/02 524/449 |
| 7,202,306 | B2 | 4/2007 | Tanaka et al. | |
| 7,893,153 | B2 | 2/2011 | Tanaka et al. | |
| 2002/0004565 | A1 * | 1/2002 | Barghoorn | C08F 279/02 526/87 |
| 2003/0176276 | A1 * | 9/2003 | Luo | C08F 36/04 502/150 |
| 2011/0178198 | A1 * | 7/2011 | Backer | C08F 255/00 521/149 |
| 2011/0184137 | A1 * | 7/2011 | Qin | C08F 36/06 526/147 |
| 2011/0190411 | A1 * | 8/2011 | Backer | C08F 255/00 521/142 |
| 2012/0255661 | A1 * | 10/2012 | Qin | B60C 1/00 152/450 |
| 2016/0108210 | A1 * | 4/2016 | Sato | B60C 1/00 524/265 |
| 2016/0177008 | A1 * | 6/2016 | Flook | C08F 230/08 526/134 |
| 2017/0152374 | A1 * | 6/2017 | Takeda | B60C 1/00 |
| 2017/0233560 | A1 * | 8/2017 | Kuramoto | B60C 1/00 524/521 |
| 2017/0275391 | A1 * | 9/2017 | Kim | C08F 136/06 |

FOREIGN PATENT DOCUMENTS

| | | | | |
|---|---|---|---|---|
| JP | 01272610 A * | 10/1989 | | C08F 36/00 |
| WO | WO-2016080764 A1 * | 5/2016 | | C08F 4/619 |

OTHER PUBLICATIONS

Machine translation of JP62227912, 16 pages, translation generated Nov. 2019. (Year: 2019).*
Abstract of Serebrannikova et al. "New organosilicon amines of the acetylene series" Obshch. Khim. 41, 1756, 1971. (Year: 1971).*
Leicht et al. "Stereoselective Copolymerization of Butadiene and Functionalized 1,3-Dienes" ACS Macro Lett. 2016, 5, 777-780. (Year: 2016).*
Kloster-Jensen et al., "New Silacycloalkynes with up to Four 1,4-Disila-2-alkyne Units in the Ring," Angew. Chem. Int. Ed. Engl. 24(7):565-566 (1985).
Yamamoto et al., "Polymerization Behavior and gel Properties of Ethane, Ethylene and Acetylene-Bridged Polysilsesquioxanes," J. Sol-Gel. Sci. Tech. 71:24-30 (2014).
Lettan et al., "Lewis Base-Catalyzed Additions of Alkynes Using Trialkoxysilylalkynes," Org. Lett. 7(15):3227-3230 (2005).
Boury et al., "Hybrid Organic-Inorganic Xerogel Access to Meso- and Microporous Silica by Thermal and Chemical Treatment," Chem. Mater. 11:281-291 (1999).
Iowa State University—KKPC Technical Meeting (May 31, 2016).
Kwag, "A Highly Reactive and Monomeric Neodymium Catalyst," Macromol. 35:4875-4879 (2002).
Schmidt et al., "New Butadiene Polymerization Catalysts and Polybutadiene Functionalization: Progress Report," Presentation at Iowa State University (Feb. 28, 2016).

* cited by examiner

END GROUP FUNCTIONALIZATION AGENTS FOR POLYDIENE

This application claims the priority benefit of U.S. Provisional Patent Application Ser. No. 62/574,963, filed Oct. 20, 2017, which is hereby incorporated by reference in its entirety.

FIELD OF THE INVENTION

The present invention relates to an end group functionalization agents for polydiene.

BACKGROUND OF THE INVENTION

Since fuel economies and the need to preserve the environment have become priorities, the tire industry has been challenged to design tires that have improved rolling resistance, which contributes to better fuel efficiency. Attempts to improve rolling resistance have included alternate tire designs and the use of rubber that has less hysteresis loss.

Tires are composed of a mixture of natural rubber, synthetic polybutadiene rubber, filler, and other organic and inorganic materials. The dispersion of the filler, typically either carbon black or silica, in the rubber affects the tire's properties. These properties include the rolling resistance, the wear resistance, and the tensile strength.

As for 1,3-butadiene polymerization, neodymium-based catalyst has also drawn particular interest since it gives a higher cis microstructure than any other catalysts such as Li-, Na-, Ti-, Co- and Ni-catalysts do, and exhibits pseudo-living character which is a very rare case in Ziegler-Natta catalyst reactions. Nd-polybutadiene also shows high abrasion resistance, low heat build-up, and high resilience, which are very demanded properties for tire, golf-ball as well as high impact polystyrene (HIPS) applications.

The present invention is directed to overcoming deficiencies in the art.

SUMMARY OF THE INVENTION

One aspect of the present invention relates to a modified polymer having the structure of Formula (I):

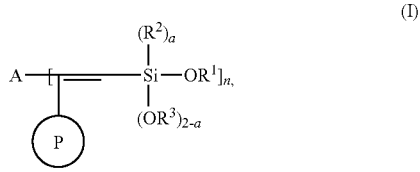

wherein

is a polymer;

A is selected from the group consisting of

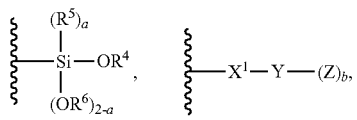

$C_{1-15}$ alkyl, $C_{1-15}$ alkylene, $C_{3-8}$ cycloalkyl, aryl, arylene, and

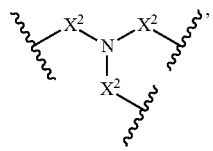

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and $-NR^7R^8$;

is a point of attachment of A to

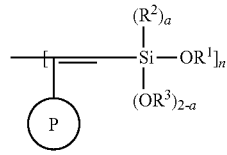

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkylene;
Y is O or N;
Z is H, $R^9$, or $Si(R^{10})_3$;
a is 0 to 2;
b is 1 or 2; and
n is 1 to 3.

Another aspect of the present invention relates to a compound having the structure of Formula (II):

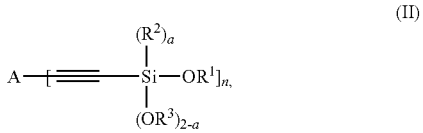

wherein
A is selected from the group consisting of

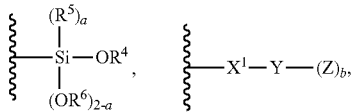

$C_{1-15}$ alkyl, $C_{1-15}$ alkylene, $C_{3-8}$ cycloalkyl, aryl, arylene, and

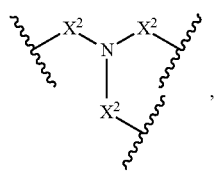

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and $-NR^7R^8$;

is a point of attachment of A to

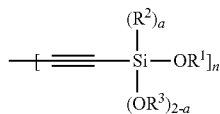

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkyene;
Y is O or N;
Z is H, $R^9$, or $Si(R^{10})_3$;
a is 0 to 2;
b is 1 or 2;
n is 1 to 3; and
wherein 1) if a is 0; $R^1$ and $R^3$ are Et, then A cannot be $-Si(OEt)_3$, n-Bu, i-Pr, t-Bu, or Ph, 2) if a is 0; $R^1$ and $R^3$ are Me, then A cannot be $C_{2-8}$ alkylene.

Yet another aspect of the present invention relates to a process for polymerizing unsaturated hydrocarbon monomers. This process includes: providing unsaturated hydrocarbon monomers; providing a compound of Formula (II):

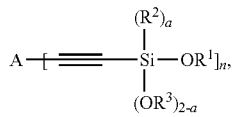

wherein
A is selected from the group consisting of

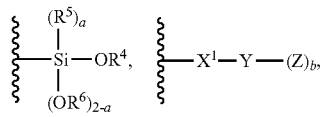

$C_{1-15}$ alkyl, $C_{1-15}$ alkylene, $C_{3-8}$ cycloalkyl, aryl, arylene, and

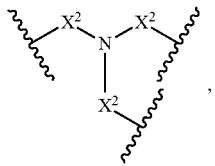

wherein $C_{1-15}$ alky, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and $-NR^7R^8$;

is a point of attachment of A to

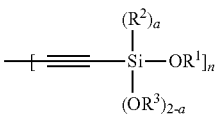

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkyene;
Y is O or N;
Z is H, $R^9$, or $Si(R^{10})_3$;
a is 0 to 2;
b is 1 or 2;
n is 1 to 3; and providing a catalyst selected from the group consisting of: (1) a mixture of (A) a compound of Formula $M^1A^1_3$; (B) a halogen containing compound; and (C) an organometallic compound, wherein $M^1$ is a lanthanide metal; $A^1$ is $C_{8-20}$ carboxylate; (2) a mixture of (A) a compound of Formula $M^2(HA^2)A^2_3$; (B) a halogen containing compound; and (C) an organometallic compound, wherein $M^2$ is a lanthanide metal; $A^2$ is $C_{8-20}$ carboxylate; (3) a compound of Formula Li-Alk, wherein Alk is $C_{1-6}$ alkyl; and (4) a compound of Formula (III): $MC(SiHAlk_2)_3(R^{11})_2$ (III), wherein M is a lanthanide or a transition metal; Alk is $C_{1-6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1-6}$ alkyl; and polymerizing the unsaturated hydrocarbon monomers in the presence of the catalyst and the compound of Formula (II) under conditions effective to produce the modified polymer.

Another aspect of the present invention relates to a process for producing a modified polymer. This process includes: providing a polymer; providing a compound of Formula (II):

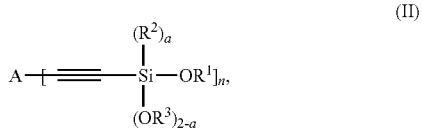

(II)

wherein
A is selected from the group consisting of

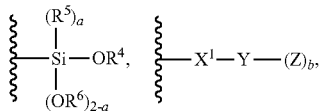

$C_{1-15}$ alkyl, $C_{1-15}$ alkylene, $C_{3-8}$ cycloalkyl, aryl, arylene, and

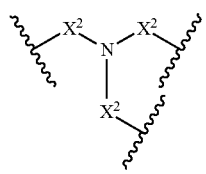

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and $-NR^7R^8$;

is a point of attachment of A to

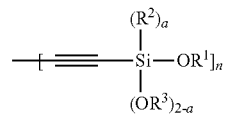

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkyene;
Y is O or N;
Z is H, $R^9$, or $Si(R^{10})_3$;
a is 0 to 2;
b is 1 or 2;
n is 1 to 3; and
reacting the polymer with the compound of Formula (II) under conditions effective to produce the modified polymer.

Yet another aspect of the present invention relates to a modified polymer having the structure of Formula (IV):

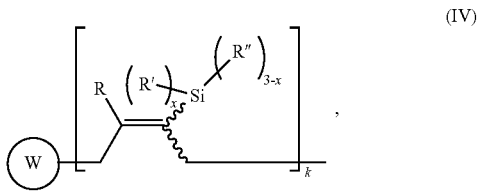

(IV)

wherein
each $\xi$ indicates a bond with cis and/or trans geometric isomerism;

is a polymer of formula

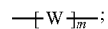

R is H or $C_{1-6}$ alkyl;
R' is selected from the group consisting of H, $C_{1-6}$ alkyl, $-OC_{1-6}$ alkyl; $-NR^aR^b$;
R'' is H or $C_{1-6}$ alkyl;
$R^a$ is H or $C_{1-6}$ alkyl;
$R^b$ is H or $C_{1-6}$ alkyl;
W is a repeating unit of the polymer;
m is 1000 to 55000;
k is 1 or 500; and
x is 0 to 3.

A further aspect of the present invention relates to a process for polymerizing unsaturated hydrocarbon monomers. This process includes:

providing unsaturated hydrocarbon monomers;
providing a compound of Formula (V)

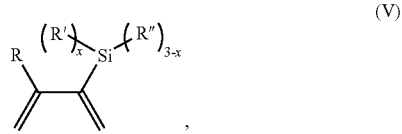
(V)

wherein
R is H or $C_{1-6}$ alkyl;
R' is selected from the group consisting of H, $C_{1-6}$ alkyl, $-OC_{1-6}$ alkyl; $-NR^aR^b$;
R" is H or $C_{1-6}$ alkyl;
$R^a$ is H or $C_{1-6}$ alkyl;
$R^b$ is H or $C_{1-6}$ alkyl; and
x is 0 to 3; and providing a catalyst selected from the group consisting of: (1) a mixture of (A) a compound of Formula $M^1A^1_3$; (B) a halogen containing compound; and (C) an organometallic compound, wherein $M^1$ is a lanthanide metal; $A^1$ is $C_{8-20}$ carboxylate; (2) a mixture of (A) a compound of Formula $M^2(HA^2)A^2_3$; (B) a halogen containing compound; and (C) an organometallic compound, wherein $M^2$ is a lanthanide metal; $A^2$ is $C_{8-20}$ carboxylate; (3) a compound of Formula Li-Alk, wherein Alk is $C_{1-6}$ alkyl; and (4) a compound of Formula (III): $MC(SiHAlk_2)_3(R^{11})_2$ (III), wherein M is a lanthanide or a transition metal; Alk is $C_{1-6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1-6}$ alkyl; and polymerizing the unsaturated hydrocarbon monomers in the presence of the catalyst and the compound of Formula (V) under conditions effective to produce the modified polymer.

Yet another aspect of the present invention relates to a process for producing a modified polymer. This process includes:

providing a polymer;
providing a compound of Formula (V):

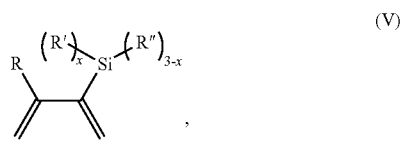
(V)

wherein
R is H or $C_{1-6}$ alkyl;
R' is selected from the group consisting of H, $C_{1-6}$ alkyl, $-OC_{1-6}$ alkyl; $-NR^aR^b$;
R" is H or $C_{1-6}$ alkyl;
$R^a$ is H or $C_{1-6}$ alkyl;
$R^b$ is H or $C_{1-6}$ alkyl;
x is 0 to 3; and
reacting the polymer with the compound of Formula (V) under conditions effective to produce the modified polymer.

Tires are composed of a mixture of natural rubber, synthetic polybutadiene rubber produced from neodymium catalysis, filler, and other organic and inorganic materials. The dispersion of the filler, typically either carbon black or silica, in the rubber affects the tire's properties. These properties include the rolling resistance, the wear resistance, and the tensile strength. Interactions between polymer chain ends and filler may be enhanced through chain end functionalization reactions.

The present application describes a new class of functionalization agents that can be added to neodymium-catalyzed butadiene polymerizations to give end-group functionalizations that improve the properties of poly butadiene rubber in compound formulations when compared to current commercial standard formulations. These organic functionalization groups attach to polymer chain ends through active polymerization sites through interaction with an alkyne group. Functional groups such as triethoxysilyl groups bonded to the alkyne were incorporated into chain ends, and these are believed to interact with silica filler to provide formulations with improved fuel efficiency and wet skid resistance.

DETAILED DESCRIPTION OF THE INVENTION

Figure 1:
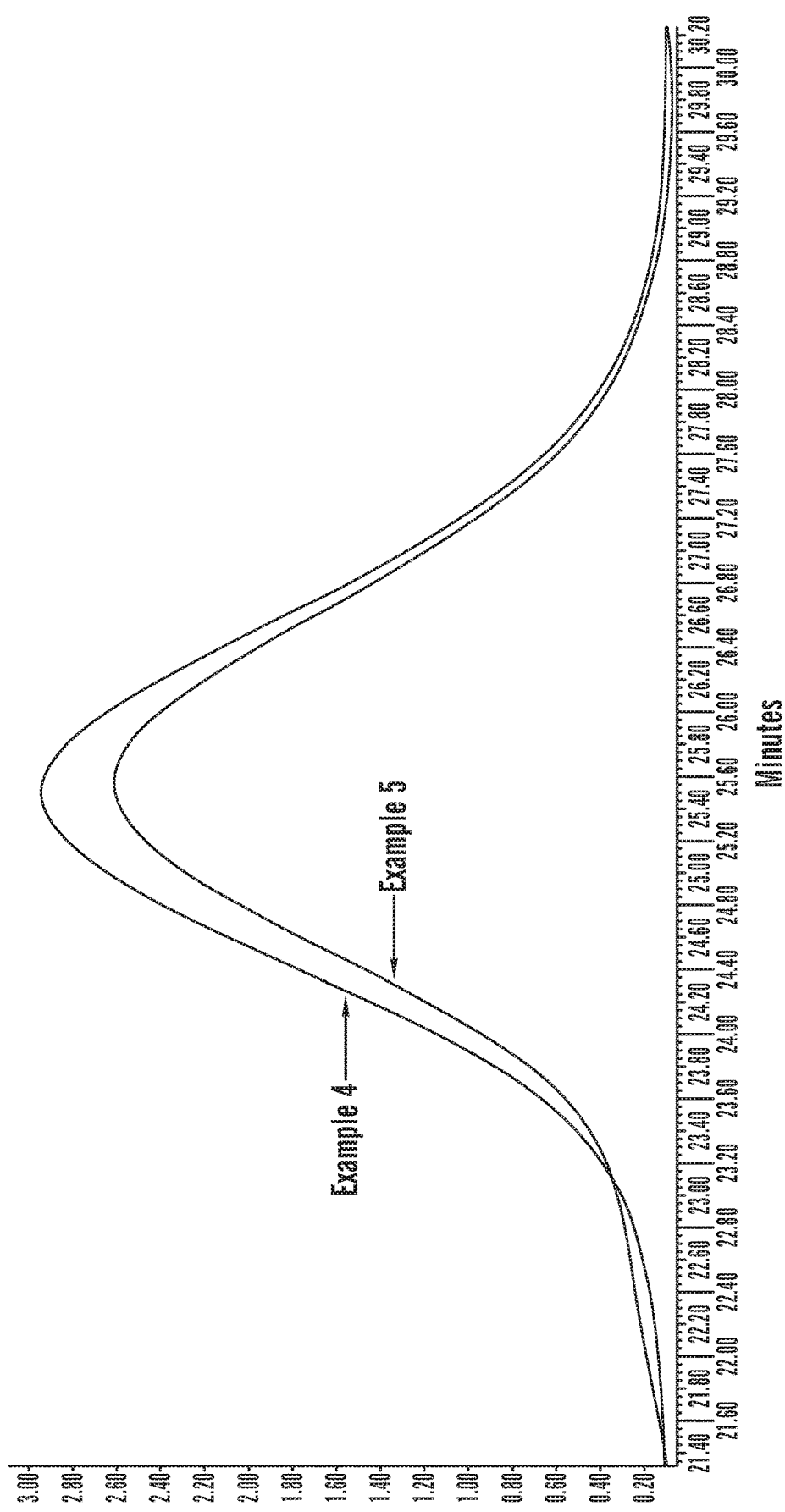
FIG. 1 shows the results of gel permeating chromatography for polymers produced in Examples 4 and 5.

The present invention relates to a modified polymer having the structure of Formula (I):

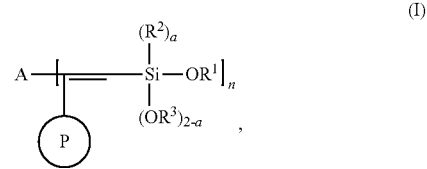
(I)

wherein

is a polymer;
A is selected from the group consisting of

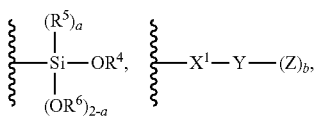

$C_{1-15}$ alkyl, $C_{1-15}$ alkylene, $C_{3-8}$ cycloalkyl, aryl, arylene, and

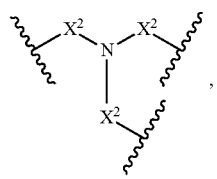

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and —$NR^7R^8$;

is a point of attachment of A to

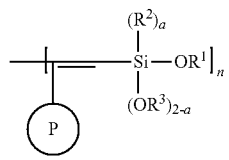

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkylene;
Y is O or N;
Z is H, $R^9$, or $Si(R^{10})_3$;
a is 0 to 2;
b is 1 or 2; and
n is 1 to 3.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "lanthanide" or "lanthanide metal atom" refers to the element with atomic numbers 57 to 71. Lanthanides include La, Ce, Pr, Nd, Pm, Sm, Eu, Gd, Tb, Dy, Ho, Er, Tm, Yb, and Lu.

The term "transition metal" refers to an element whose atom has an incomplete d sub-shell, or which can give rise to cations with an incomplete d sub-shell. Transition metals include Sc, Ti, V, Cr, Mn, Fe, Co, Ni, Cu, Y, Zr, Nb, Mo, Tc, Ru, Rh, Pd, Ag, Cd, La, Hf, Ta, W, Re, Os, Ir, Pt, Au, Hg, Ac, Rf, and Ha.

The term "alkyl" refers to an aliphatic hydrocarbon group which may be straight or branched having about 1 to about 15 carbon atoms in the chain. Branched means that one or more lower alkyl groups such as methyl, ethyl, or propyl are attached to a linear alkyl chain. Exemplary alkyl groups include methyl, ethyl, n-propyl, i-propyl, n-butyl, t-butyl, n-pentyl, and 3-pentyl.

The term "alkylene" refers to a group obtained by removal of a hydrogen atom from an alkyl group. Non-limiting examples of alkylene include methylene and ethylene.

The term "cycloalkyl" refers to a non-aromatic, saturated or unsaturated, mono- or multi-cyclic ring system of about 3 to about 8 carbon atoms, or of about 5 to about 7 carbon atoms, and which may include at least one double bond. Exemplary cycloalkyl groups include, without limitation, cyclopropyl, cyclobutyl, cyclopentyl, cyclohexyl, cycloheptyl, cyclopropenyl, cyclobutenyl, cyclopentenyl, cyclophenyl, anti-bicyclopropane, and syn-tricyclopropane.

The term "aryl" refers to an aromatic monocyclic or multi-cyclic (polycyclic) ring system of 6 to about 19 carbon atoms, or of 6 to about 10 carbon atoms, and includes arylalkyl groups. The ring system of the aryl group may be optionally substituted. Representative aryl groups include, but are not limited to, groups such as phenyl, naphthyl, azulenyl, phenanthrenyl, anthracenyl, fluorenyl, pyrenyl, triphenylenyl, chrysenyl, and naphthacenyl.

The term "alkoxy" means groups of from 1 to 15 carbon atoms of a straight, branched, or cyclic configuration and combinations thereof attached to the parent structure through an oxygen. Examples include methoxy, ethoxy, propoxy, isopropoxy, cyclopropyloxy, cyclohexyloxy, and the like.

The term "arylalkyl" means an alkyl residue attached to an aryl ring. Examples are benzyl, phenethyl, and the like.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "arylene" refers to a group obtained by removal of a hydrogen atom from an aryl group. Non-limiting examples of arylene include phenylene and naphthylene.

The term "halide" refers to a halogen atom bearing a negative charge.

The term "halogen" means fluoro, chloro, bromo, or iodo.

The term "bis(oxazolinato)" or "BOX" refers to compounds containing two oxazoline rings. Exemplary bis(oxazolinato) ligands are shown below.

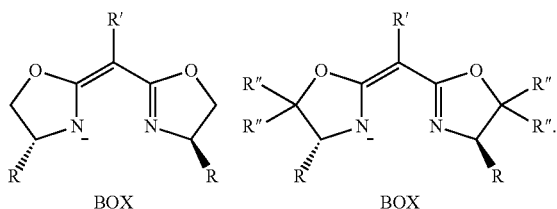

BOX            BOX

The term "alkyl aluminate" refers to compounds represented by the formula $[Al[O_m(R^1O)_nR^2{}_o]_n]^-$, wherein $R^1O$ is alkyloxide; $R^2$ is alkyl; the sum of $m/2+n+o$ is 4; and n is 1 to 4.

The term "carboxylate" refers to a conjugate base of a carboxylic acid, $RCOO^-$ (where R is the organic substituent).

The term "acetyl acetonate" refers to the enol form of acetylacetone.

The term "amidate" refers to a carboximate of the type $RCONR'^-$, as the conjugate base of an amide $RCONHR'$ (where R and R' are organic substituents).

The term "alkoxide" refers to the conjugate base of an alcohol, $RO^-$ (where R is the organic substituent).

The term "amide" refers to a conjugate base of ammonia (the anion $H_2N^-$) or of an organic amine (an anion $R_2N^-$).

The term "phenyl" means a phenyl group as shown below:

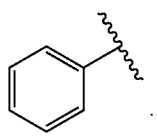

The term "optionally substituted" is used to indicate that a group may have a substituent at each substitutable atom of the group (including more than one substituent on a single atom), provided that the designated atom's normal valency is not exceeded and the identity of each substituent is independent of the others. Up to three H atoms in each residue are replaced with alkyl, halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. "Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

In one embodiment, the modified polymer has the structure of Formula (Ia):

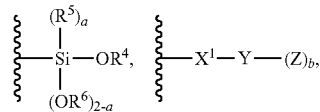

(Ia)

wherein
A is selected from the group consisting of

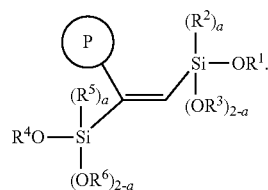

$C_{1-15}$ alkyl, $C_{3-8}$ cycloalkyl, and aryl, wherein $C_{1-15}$ alkyl, $C_{3-8}$ cycloalkyl, and aryl can be optionally substituted from 1 to 4 times with a substituent independently selected from the group consisting of H, halogen, $C_{1-6}$ alkyl, and $-NR^7R^8$.

In another embodiment, the modified polymer has the structure:

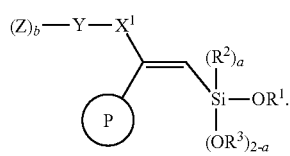

In a further embodiment, the modified polymer has the structure:

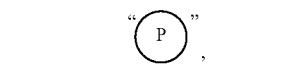

The term "polymer",

or

refers to any suitable polymer. In one embodiment polymer

is prepared by polymerization of any unsaturated hydrocarbon monomer or monomers. In another embodiment polymer (W)

is prepared by polymerization of any unsaturated hydrocarbon monomer or monomers.

Preferred monomers that can be used according to prepare polymer (P)

or (W)

according to the present invention include olefins, polyenes, and vinyl aromatic hydrocarbons.

Polyenes, particularly dienes and trienes (e.g., myrcene) can be employed in accordance with the present invention. Illustrative polyenes include $C_4$-$C_{30}$ dienes, preferably $C_4$-$C_{12}$ dienes. Preferred among these are conjugated dienes such as, but not limited to, 1,3-butadiene, 1,3-pentadiene, 1,3-hexadiene, 1,3-octadiene, 2,3-dimethyl-1,3-butadiene, 2-ethyl-1,3-butadiene, 2-methyl-1,3-butadiene, 2-methyl-1,3-pentadiene, 3-methyl-1,3-pentadiene, 4-methyl-1,3-pentadiene, 2,4-hexadiene, and the like.

Examples of olefins that can be employed according to the present invention include $C_2$-$C_{30}$ straight chain or branched α-olefins such as ethylene, propylene, 1-butene, 1-pentene, 3-methyl-1-butene, 1-hexene, 4-methyl-1-pentene, 3-methyl-1-pentene, 1-octene, and the like, as well as $C_3$-$C_{30}$ cyclo-olefins such as cyclopentene, cycloheptene, norbornene, 5-methyl-2-norbornene, and tetra-cyclododecene.

Vinyl aromatic hydrocarbons which may be used according to the present invention include vinyl aryl compounds such as, styrene, various alkyl-substituted styrenes, alkoxy-substituted styrenes, 2-vinylpyridine, 4-vinylpyridine, vinylnaphthalene, alkyl-substituted vinyl napthalenes and the like.

One embodiment relates to the modified polymer of the present invention where the polymer (P)

has 1,4-cis content of 15 to 99%, or of 20 to 99%, or of 25 to 99%, or of 30 to 99%, or of 35 to 99%, or of 40 to 99%, or of 45 to 99%, or of 50 to 99%, or of 55 to 99%, or of 60 to 99%, or of 65 to 99%, or of 70 to 99%, or of 75 to 99%, or of 80 to 99%, or of 85 to 99%, or of 90 to 99%, or of 95% to 99%.

Another embodiment relates to the modified polymer of the present invention where the polymer (P)

has 1,4-cis content of 15 to 20%, or of 20 to 25%, or of 25 to 30%, or of 30 to 35%, or of 35 to 40%, or of 40 to 45%, or of 45 to 50%, or of 50 to 55%, or of 55 to 60%, or of 60 to 65%, or of 65 to 70%, or of 70 to 75%, or of 75 to 80%, or of 80 to 85%, or of 85 to 90%, or of 90 to 95%, or of 95% to 99%.

Yet another embodiment relates to the modified polymer of the present invention where the polymer (P)

is a polymer of 1,3-butadiene, isoprene, 2,3-dimethyl-1,3-butadiene, 1,3-pentadiene, 1,3-hexadiene, or myrcene. Another embodiment relates to the modified polymer of the present invention where the polymer (P)

is a polymer of isoprene.

Another aspect of the present invention relates to a compound having the structure of Formula (II):

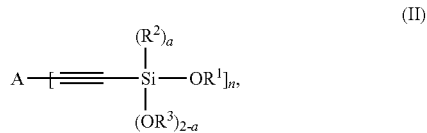

wherein
A is selected from the group consisting of

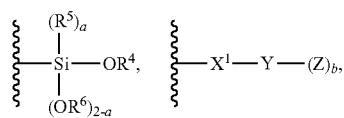

$C_{1-15}$ alkyl, $C_{1-15}$ alkylene, $C_{3-8}$ cycloalkyl, aryl, arylene, and

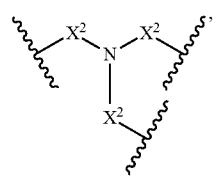

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and —$NR^7R^8$;

is a point of attachment of A to

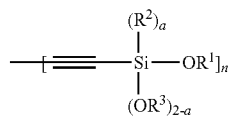

group;

R¹ is $C_{1-6}$ alkyl;
R² is H or $C_{1-6}$ alkyl;
R³ is H or $C_{1-6}$ alkyl;
R⁴ is $C_{1-6}$ alkyl;
R⁵ is H or $C_{1-6}$ alkyl;
R⁶ is H or $C_{1-6}$ alkyl;
R⁷ is H or $C_{1-6}$ alkyl;
R⁸ is H or $C_{1-6}$ alkyl;
R⁹ is $C_{1-6}$ alkyl;
R¹⁰ is $C_{1-6}$ alkyl;
X¹ is $C_{1-6}$ alkylene;
X² is $C_{1-15}$ alkyene;
Y is O or N;
Z is H, R⁹, or Si(R¹⁰)₃;
a is 0 to 2;
b is 1 or 2;
n is 1 to 3; and
wherein 1) if a is 0; R¹ and R³ are Et, then A cannot be —Si(OEt)₃, n-Bu, i-Pr, t-Bu, or Ph, 2) if a is 0; R¹ and R³ are Me, then A cannot be $C_{2-8}$ alkylene.

In one embodiment, the compound of Formula (II) has the Formula (IIa):

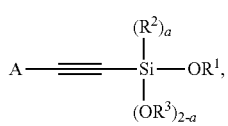

wherein
A is selected from the group consisting of

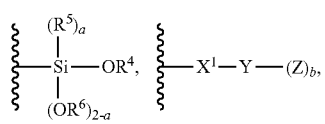

$C_{1-15}$ alkyl, $C_{3-8}$ cycloalkyl, and aryl, wherein $C_{1-15}$ alkyl, $C_{3-8}$ cycloalkyl, and aryl can be optionally substituted from 1 to 4 times with a substituent independently selected from the group consisting of H, halogen, $C_{1-6}$ alkyl, and —NHR⁷R⁸.

In one embodiment, the compound of Formula (IIa) has the following structure:

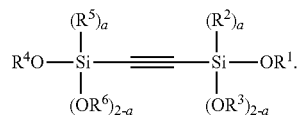

In another embodiment, the compound of Formula (IIa) has the following structure:

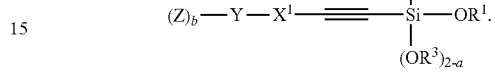

Another aspect of the present invention relates to a process for polymerizing unsaturated hydrocarbon monomers. This process includes: providing unsaturated hydrocarbon monomers; providing a compound of Formula (II):

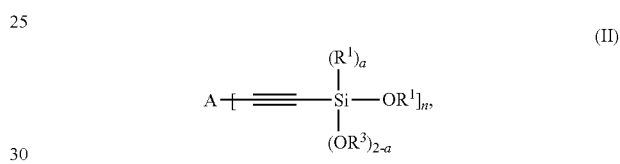

wherein
A is selected from the group consisting of

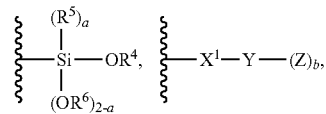

$C_{1-15}$ alkyl, $C_{1-15}$ alkylene, $C_{3-8}$ cycloalkyl, aryl, arylene, and

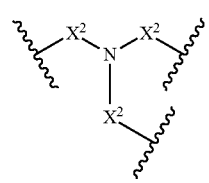

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and —NR⁷R⁸;

is a point of attachment of A to

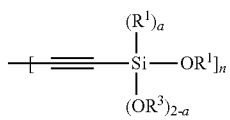

group;
R$^1$ is C$_{1-6}$ alkyl;
R$^2$ is H or C$_{1-6}$ alkyl;
R$^3$ is H or C$_{1-6}$ alkyl;
R$^4$ is C$_{1-6}$ alkyl;
R$^5$ is H or C$_{1-6}$ alkyl;
R$^6$ is H or C$_{1-6}$ alkyl;
R$^7$ is H or C$_{1-6}$ alkyl;
R$^8$ is H or C$_{1-6}$ alkyl;
R$^9$ is C$_{1-6}$ alkyl;
R$^{10}$ is C$_{1-6}$ alkyl;
X$^1$ is C$_{1-6}$ alkylene;
X$^2$ is C$_{1-15}$ alkyene;
Y is O or N;
Z is H, R$^9$, or Si(R$^{10}$)$_3$;
a is 0 to 2;
b is 1 or 2;
n is 1 to 3; and
providing a catalyst selected from the group consisting of: (1) a mixture of (A) a compound of Formula M$^1$A$^1_3$; (B) a halogen containing compound; and (C) an organometallic compound, wherein M$^1$ is a lanthanide metal; A$^1$ is C$_{8-20}$ carboxylate; (2) a mixture of (A) a compound of Formula M$^2$(HA$^2$)A$^2_3$; (B) a halogen containing compound; and (C) an organometallic compound, wherein M$^2$ is a lanthanide metal; A$^2$ is C$_{8-20}$ carboxylate; (3) a compound of Formula Li-Alk, wherein Alk is C$_{1-6}$ alkyl; and (4) a compound of Formula (III): MC(SiHAlk$_2$)$_3$(R$^{11}$)$_2$ (III), wherein M is a lanthanide or a transition metal; Alk is C$_{1-6}$ alkyl; R$^{11}$ is halide, bis(oxazolinato), carboxylate, acetyl acetonate, amidate, alkoxide, amide, BR$^{12}_4$, AlR$^{12}_4$, or alkyl aluminate; R$^{12}$ is independently selected at each occurrence thereof from the group consisting of H, C$_6$F$_5$, phenyl, and C$_{1-6}$ alkyl; and
polymerizing the unsaturated hydrocarbon monomers in the presence of the catalyst and the compound of Formula (II) under conditions effective to produce the modified polymer.

In one embodiment, the catalyst used in process for polymerizing unsaturated hydrocarbon monomers is a mixture of (A) a compound of Formula M$^1$A$^1_3$; (B) a halogen containing compound; and (C) an organometallic compound, wherein M$^1$ is a lanthanide metal; A$^1$ is C$_{8-20}$ carboxylate.

Suitable halogen containing compounds include, but are not limited to, aluminum halogen compounds represented by Formula R$^a_n$AlX$_{3-n}$, wherein R$^a$ is hydrogen or an alkyl or aryl group containing 1 to 10 carbon atoms, X is halogen, and n is an integer from 1 to 3; and inorganic or organic halogen compounds in which aluminum is completely substituted by boron, silicon, tin or titanium in the aluminum halogen compounds, wherein the halogen containing compounds are preferably alkyl halogen compounds containing 4 to 20 carbon atoms.

Suitable organometallic compounds include, but are not limited to, alkyl aluminum compounds represented by AlR$^b_3$; alkyl magnesium compounds represented by MgR$^b_2$; alkyl zinc compounds represented by ZnR$^b_2$ and alkyl lithium compounds represented by LiR$^b$ wherein R$^b$ is hydrogen or an alkyl, cycloalkyl, aryl, arylaklyl, or alkoxy group containing 1 to 10 carbon atoms. Exemplary suitable organometallic compounds include, without limitation, trimethyl aluminum, triethyl aluminum, tripropyl aluminum, tributyl aluminum, triisobutyl aluminum, trihexyl aluminum, diisobutyl aluminum hydride, dibutyl magnesium, diethyl magnesium, dibutyl zinc, diethyl zinc, and n-butyl lithium.

In another embodiment, the catalyst used in the process for polymerizing unsaturated hydrocarbon monomers is a mixture of (A) a compound of Formula M$^2$(HA$^2$)A$^2_3$; (B) a halogen containing compound; and (C) an organometallic compound, wherein M$^2$ is a lanthanide metal; A$^2$ is C$_{8-20}$ carboxylate.

In yet another embodiment, the catalyst is a compound of Formula Li-Alk, wherein Alk is C$_{1-6}$ alkyl.

In a further embodiment, the catalyst is a compound of Formula (III): MC(SiHAlk$_2$)$_3$(R$^{11}$)$_2$ (III), wherein M is a lanthanide or a transition metal; Alk is C$_{1-6}$ alkyl; R$^{11}$ is halide, bis(oxazolinato), carboxylate, acetyl acetonate, amidate, alkoxide, amide, BR$^{12}_4$, AlR$^{12}_4$, or alkyl aluminate; R$^{12}$ is independently selected at each occurrence thereof from the group consisting of H, C$_6$F$_5$, phenyl, and C$_{1-6}$ alkyl.

The modified polymer, according to the present invention, can be prepared according to the Schemes 1-5 shown below.

Scheme 1

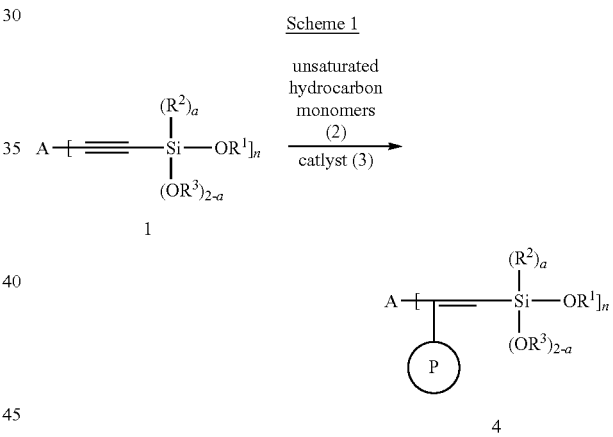

Scheme 2

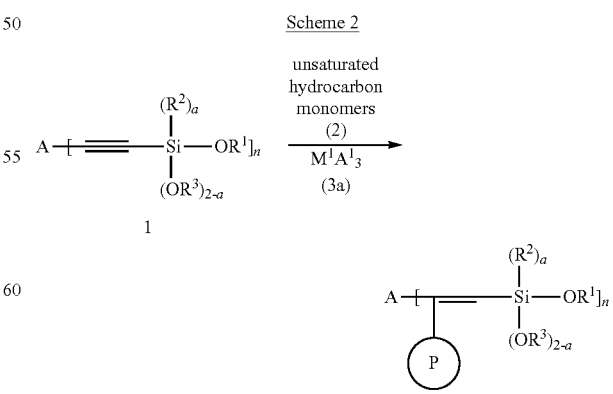

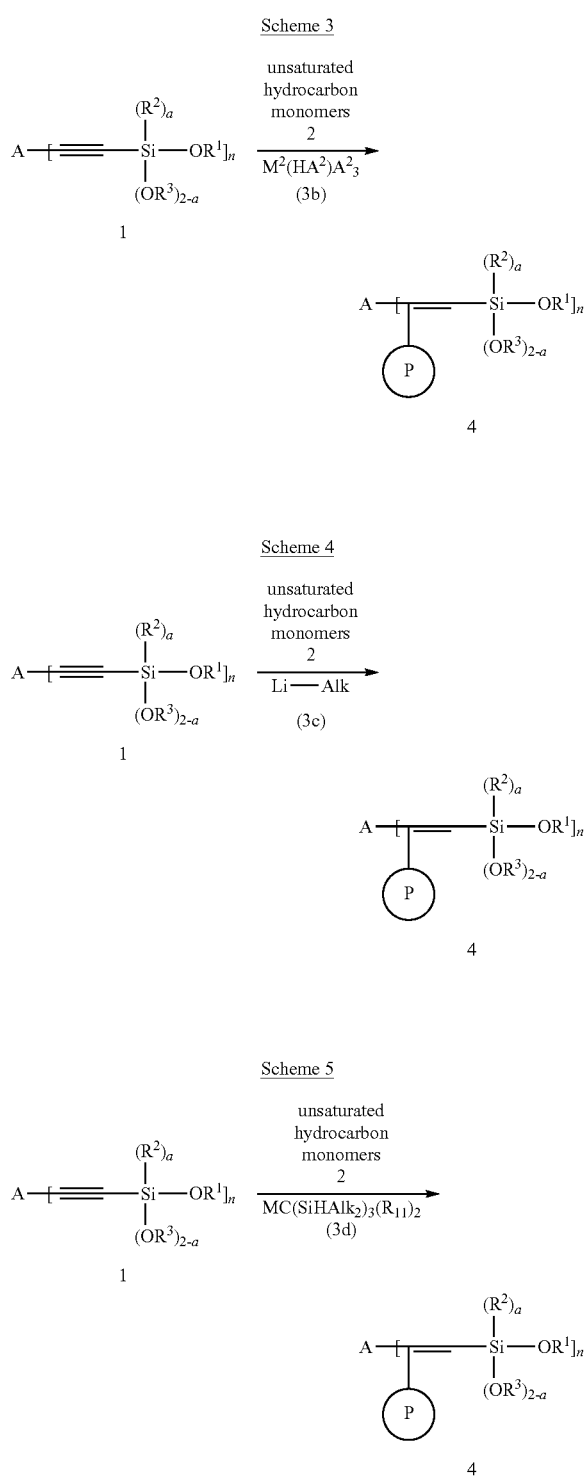

Unsaturated hydrocarbon monomer or monomers (2) can be polymerized in the presence of the compound (1) and catalyst (3). Reaction can be carried in a variety of solvents at room temperature or at elevated temperature. In some embodiments, the reaction can be carried out in the presence of a halogen containing compound. In some embodiments, the reaction can be carried out in the presence of an organometallic compound. The polymerization reaction can be terminated by using reaction terminators.

The processes of this invention are used to polymerize any unsaturated hydrocarbon monomer or monomers. Preferred monomers that can be used according to the present invention include olefins, polyenes, and vinyl aromatic hydrocarbons.

Polyenes, particularly dienes and trienes (e.g., myrcene) can be employed in accordance with the present invention. Illustrative polyenes include $C_4$-$C_{30}$ dienes, preferably $C_4$-$C_{12}$ dienes. Preferred among these are conjugated dienes such as, but not limited to, 1,3-butadiene, 1,3-pentadiene, 1,3-hexadiene, 1,3-octadiene, 2,3-dimethyl-1,3-butadiene, 2-ethyl-1,3-butadiene, 2-methyl-1,3-butadiene, 2-methyl-1,3-pentadiene, 3-methyl-1,3-pentadiene, 4-methyl-1,3-pentadiene, 2,4-hexadiene, and the like.

Examples of olefins that can be employed according to the present invention include $C_2$-$C_{30}$ straight chain or branched α-olefins such as ethylene, propylene, 1-butene, 1-pentene, 3-methyl-1-butene, 1-hexene, 4-methyl-1-pentene, 3-methyl-1-pentene, 1-octene, and the like, as well as $C_3$-$C_{30}$ cyclo-olefins such as cyclopentene, cycloheptene, norbornene, 5-methyl-2-norbornene, and tetra-cyclododecene.

Vinyl aromatic hydrocarbons which may be used according to the present invention include vinyl aryl compounds such as, styrene, various alkyl-substituted styrenes, alkoxy-substituted styrenes, 2-vinylpyridine, 4-vinylpyridine, vinylnaphthalene, alkyl-substituted vinyl napthalenes and the like.

One embodiment relates to the process of the present invention where the unsaturated hydrocarbon monomer is a 1,3-butadiene, isoprene, 2,3-dimethyl-1,3-butadiene, 1,3-pentadiene, 1,3-hexadiene, or myrcene. In one embodiment, the monomer is isoprene.

Depending on the catalyst used for the polymerization, the modified polymer of the present invention can be prepared with varying degrees of 1,4-cis content.

One embodiment relates to the modified polymer of the present invention has 1,4-cis content of 15 to 99%, or of 20 to 99%, or of 25 to 99%, or of 30 to 99%, or of 35 to 99%, or of 40 to 99%, or of 45 to 99%, or of 50 to 99%, or of 55 to 99%, or of 60 to 99%, or of 65 to 99%, or of 70 to 99%, or of 75 to 99%, or of 80 to 99%, or of 85 to 99%, or of 90 to 99%, or of 95% to 99%.

Another embodiment relates to the modified polymer of the present invention has 1,4-cis content of 15 to 20%, or of 20 to 25%, or of 25 to 30%, or of 30 to 35%, or of 35 to 40%, or of 40 to 45%, or of 45 to 50%, or of 50 to 55%, or of 55 to 60%, or of 60 to 65%, or of 65 to 70%, or of 70 to 75%, or of 75 to 80%, or of 80 to 85%, or of 85 to 90%, or of 90 to 95%, or of 95% to 99%.

Another embodiment relates to the modified polymer of the present invention has more than 90% 1,4-cis content.

The non-polar solvent used for the polymerization of unsaturated hydrocarbon monomers should contain at least one or more aliphatic hydrocarbons (e.g., butane, pentane, hexane, isopentane, heptane, octane, and isooctane); cycloaliphatic hydrocarbons (e.g., cyclopentane, methylcyclopentane, cyclohexane, methylcyclohexane, and ethylcyclohexane); aromatic hydrocarbons (e.g., benzene, toluene, ethylbenzene, or xylene).

Another embodiment relates to the process of the present invention where polymerization is carried in a presence of a solvent. In one embodiment, the solvent is a non-polar solvent not reactive with the components of the catalyst system. Examples of suitable solvents include: aliphatic hydrocarbons such as pentane, hexane, isopentane, heptane, octane and isooctane; cycloaliphatic hydrocarbons such as cyclopentane, methyl cyclopentane, cyclohexane, methyl cyclohexane and ethyl cyclohexane; and aromatic hydrocarbons such as benzene, toluene, ethylbenzene and xylene. Preferred non-polar solvents include cyclohexane, hexane, heptane, or toluene.

The polymerization solvent, which can significantly affect polymerization, is used after removal of oxygen and water. Polymerization is initiated in an inert atmosphere (preferably, under high-purity nitrogen atmosphere) and the polymerization temperature is preferably carried out at room temperature to 100° C., more preferably 40° C. to 80° C., most preferably 60° C. Under the appropriate catalyst conditions, the polymerization can be carried out for 10 min to 10 hours, preferably 30 min to 6 hours, most preferably two-hours.

The molar ratio of the unsaturated hydrocarbon monomer to the solvent is 1:1 to 30:1, preferably 2:1 to 10:1.

Unsaturated hydrocarbon monomers can be added to the reaction mixture in one portion or gradually. When the unsaturated hydrocarbon monomer is gradually added to the reaction mixture, it may be allowed to react for 10 min to 3 hours prior to addition of the next portion of the unsaturated hydrocarbon monomer. More preferably, this period can be 15 min to 2 hours, most preferably 15 to 30 min.

The conversion of the unsaturated hydrocarbon monomers to the polymer under the conditions described above is more than 50%, preferably more than 80%, most preferably, more than 90%.

After polymerization is completed, known processes such as catalyst inactivation treatment, catalyst removing treatment, and drying can be performed if required. The polymerization can be completed by introducing a reaction terminator and/or a stabilizer. The resulting polybutadiene can be precipitated, for example, with methanol or ethanol.

The reaction terminators that can be used according to the present invention include polyoxyethyleneglycolether organophosphate, methanol, ethanol, isopropanol, water, or carbon dioxide, organic acids such as octanoic acid, decanoic acid and stearic acid, and the like.

The phenol stabilizers that can be used according to the present invention can be any of known phenol stabilizers having a phenol structure. Examples are 2,6-di-t-butyl-p-cresol, 2,6-di-t-butyl-4-ethylphenol, 2,6-dicyclohexyl-p-cresol, 2,6-diisopropyl-4-ethylphenol, 2,6-di-t-amyl-p-cresol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, 2-t-butyl-6-(3'-t-butyl)-5'-methyl-2'hydroxybenzyl)-4-methylphenylacrylate, t-butylhydroquinone, 2,2'-methylenebis (4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(4,6-di-t-butylphenol), 2,2'-butylidenebis(2-t-butyl-p-cresol), 1,1,3-tris(2-methyl-4-hydroxy-5-t-butylphenyl)butane, triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], n-octadecyl-3-(3',5'-di-t-butyl-4'-hydroxyphenyl)propionate, N,N'-hexamethylenebis(3,5-di-t-butyl-4-hydroxy-hydrocinnamide), 3,5-di-t-butyl-4-hydroxybenzylphosphonate-diethylester, 1,3,5-tris(2,6-dimetyl-3-hydroxy-4-t-butylbenzyl)isocyanurate, 1,3,5-tris [(3,5-di-t-butyl-4-hydroxyphenyl)propyonyloxyethyl] isocyanurate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl)propionate]methane, bis(3,5-di-t-butyl-4-hydroxybenzylphosphonate ethyl)calcium, bis(3,5-di-t-butyl-4-hydroxybenzylphosphoric acid ethyl)nickel, N,N'-bis[3,5-di-t-butyl-4-hydroxyphenyl)propyonyl]hydrazine, 2,2'-methylenebis(4-methyl-6-t-butylphenol)terephthalate, 1,3,5-trimethyl-2,4,6-tris(3,5-di-t-butyl-4-hydroxybenzyl)benzene, 3,9-bis[1,1-dimethyl-2-{3-(3-t-butyl-4-hydroxy-5-methylphenyl)propionyloxy}ethyl]-2,4,8,10-tetraoxaspiro[5,5]undecane, 2,2-bis[4-{2-(3,5-di-t-butyl-4-hydroxyhydrocinnamoyloxy)}ethoxyphenyl]propane, and the like. Preferred stabilizer is 2,6-di-t-butyl-p-cresol.

Suitable catalysts of Formula (III) can be prepared as described in U.S. Pat. No. 9,856,337, which is hereby incorporated by reference in its entirety.

In one embodiment, the catalyst comprises (A) a neodymium compound; (B) a halogen compound; and (C) an organometallic compound.

The modified polymer has a molecular weight below 4,000,000. Preferably, the modified polymer has a molecular weight below 3,500,000; the modified polymer has a molecular weight below 3,000,000; the modified polymer has a molecular weight below 2,500,000; the modified polymer has a molecular weight below 2,000,000; the modified polymer has a molecular weight below 1,500,000; the modified polymer has a molecular weight below 1,000,000; a molecular weight below 900,000; a molecular weight below 800,000; a molecular weight below 700,000; a molecular weight below 600,000; a molecular weight below 500,000.

The modified polymer has a molecular weight of 10,000 to 4,000,000. Preferably, the modified polymer has a molecular weight of 25,000 to 3,500,000; a molecular weight of 50,000 to 3,500,000; a molecular weight of 50,000 to 3,000,000; a molecular weight of 75,000 to 3,000,000; a molecular weight of 100,000 to 3,000,000; a molecular weight of 100,000 to 2,500,000; a molecular weight of 100,000 to 2,000,000; a molecular weight of 150,000 to 1,750,000; a molecular weight of 200,000 to 1,700,000; a molecular weight of 250,000 to 1,600,000; a molecular weight of 300,000 to 1,500,000; a molecular weight of 400,000 to 1,500,000; a molecular weight of 500,000 to 1,500,000; a molecular weight of 500,000 to 1,000,000.

In one embodiment, the modified polymer has a molecular weight of 100,000 to 2,000,000.

In yet another embodiment, the modified polymer has a Mooney viscosity of 10 to 100.

Another aspect of the present invention relates to a process for producing a modified polymer. This process includes: providing a polymer; providing a compound of Formula (II):

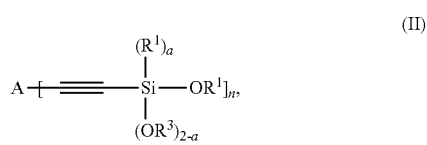

wherein
A is selected from the group consisting of

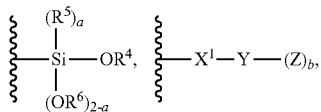

$C_{1-15}$ alkyl, $C_{1-15}$ alkylene, $C_{3-8}$ cycloalkyl, aryl, arylene, and

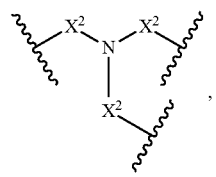

wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and $-NR^7R^8$;

is a point of attachment of A to

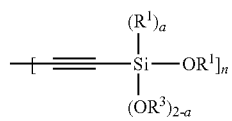

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkyene;
Y is O or N;
Z is H, $R^9$, or $Si(R^{10})_3$;
a is 0 to 2;
b is 1 or 2;
n is 1 to 3; and
reacting the polymer with the compound of Formula (II) under conditions effective to produce the modified polymer.

Yet another aspect of the present invention relates to a modified polymer having the structure of Formula (IV):

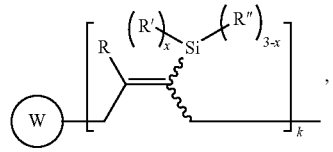

wherein
each  indicates a bond with cis and/or trans geometric isomerism;

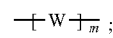

is a polymer of formula $$\vdash W \dashv_m ;$$

R is H or $C_{1-6}$ alkyl;
R' is selected from the group consisting of H, $C_{1-6}$ alkyl, $-OC_{1-6}$ alkyl; $-NR^aR^b$;
R'' is H or $C_{1-6}$ alkyl;
$R^a$ is H or $C_{1-6}$ alkyl;
$R^b$ is H or $C_{1-6}$ alkyl;
W is a repeating unit of the polymer;
m is 1000 to 55000;
k is 1 or 500; and
x is 0 to 3.

One embodiment relates to a modified polymer having the structure of Formula (IVa):

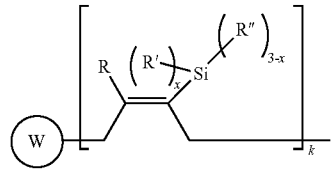

In one embodiment n~m.
In another embodiment n>>m.
One embodiment relates to the modified polymer of the present invention where the polymer

has 1,4-cis content of 15 to 99%, or of 20 to 99%, or of 25 to 99%, or of 30 to 99%, or of 35 to 99%, or of 40 to 99%, or of 45 to 99%, or of 50 to 99%, or of 55 to 99%, or of 60 to 99%, or of 65 to 99%, or of 70 to 99%, or of 75 to 99%, or of 80 to 99%, or of 85 to 99%, or of 90 to 99%, or of 95% to 99%.

Another embodiment relates to the modified polymer of the present invention where the polymer

has 1,4-cis content of 15 to 20%, or of 20 to 25%, or of 25 to 30%, or of 30 to 35%, or of 35 to 40%, or of 40 to 45%, or of 45 to 50%, or of 50 to 55%, or of 55 to 60%, or of 60 to 65%, or of 65 to 70%, or of 70 to 75%, or of 75 to 80%, or of 80 to 85%, or of 85 to 90%, or of 90 to 95%, or of 95% to 99%.

Yet another embodiment relates to the modified polymer of the present invention where the polymer

is a polymer of 1,3-butadiene, isoprene, 2,3-dimethyl-1,3-butadiene, 1,3-pentadiene, 1,3-hexadiene, or myrcene. Another embodiment relates to the modified polymer of the present invention where the polymer

is a polymer of isoprene. Yet another embodiment relates to the modified polymer of the present invention where the polymer

is a polymer of butadiene. A further embodiment relates to the modified polymer of the present invention where the polymer

is a polymer of 1,3-butadiene.

A further aspect of the present invention relates to a process for polymerizing unsaturated hydrocarbon monomers. This process includes:
  providing unsaturated hydrocarbon monomers;
  providing a compound of Formula (V):

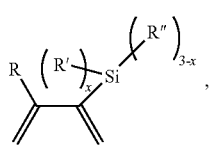

wherein
  R is H or $C_{1-6}$ alkyl;
  R' is selected from the group consisting of H, $C_{1-6}$ alkyl, —$OC_{1-6}$ alkyl; —$NR^aR^b$;
  R" is H or $C_{1-6}$ alkyl;
  $R^a$ is H or $C_{1-6}$ alkyl;
  $R^b$ is H or $C_{1-6}$ alkyl; and
  x is 0 to 3; and
  providing a catalyst selected from the group consisting of: (1) a mixture of (A) a compound of Formula $M^1A^1_3$; (B) a halogen containing compound; and (C) an organometallic compound, wherein $M^1$ is a lanthanide metal; $A^1$ is $C_{8-20}$ carboxylate; (2) a mixture of (A) a compound of Formula $M^2(HA^2)A^2_3$; (B) a halogen containing compound; and (C) an organometallic compound, wherein $M^2$ is a lanthanide metal; $A^2$ is $C_{8-20}$ carboxylate; (3) a compound of Formula Li-Alk, wherein Alk is $C_{1-6}$ alkyl; and (4) a compound of Formula (III): $MC(SiHAlk_2)_3(R^{11})_2$ (III), wherein M is a lanthanide or a transition metal; Alk is $C_{1-6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1-6}$ alkyl; and
  polymerizing the unsaturated hydrocarbon monomers in the presence of the catalyst and the compound of Formula (V) under conditions effective to produce the modified polymer.

The modified polymer has a molecular weight below 4,000,000. Preferably, the modified polymer has a molecular weight below 3,500,000; the modified polymer has a molecular weight below 3,000,000; the modified polymer has a molecular weight below 2,500,000; the modified polymer has a molecular weight below 2,000,000; the modified polymer has a molecular weight below 1,500,000; the modified polymer has a molecular weight below 1,000,000.

The modified polymer has a molecular weight of 10,000 to 4,000,000. Preferably, the modified polymer has a molecular weight of 25,000 to 3,500,000; a molecular weight of 50,000 to 3,500,000; a molecular weight of 50,000 to 3,000,000; a molecular weight of 75,000 to 3,000,000; a molecular weight of 100,000 to 3,000,000; a molecular weight of 100,000 to 2,500,000; a molecular weight of 100,000 to 2,000,000.

Yet another aspect of the present invention relates to a process for producing a modified polymer. This process includes:
  providing a polymer;
  providing a compound of Formula (V):

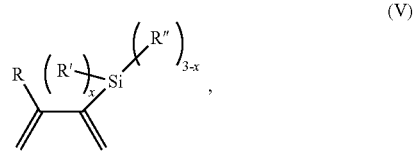

wherein
  R is H or $C_{1-6}$ alkyl;
  R' is selected from the group consisting of H, $C_{1-6}$ alkyl, —$OC_{1-6}$ alkyl; —$NR^aR^b$;
  R" is H or $C_{1-6}$ alkyl;
  $R^a$ is H or $C_{1-6}$ alkyl;
  $R^b$ is H or $C_{1-6}$ alkyl;
  x is 0 to 3; and
  reacting the polymer with the compound of Formula (V) under conditions effective to produce the modified polymer.

The modified polymer can also be prepared according to the Scheme 6 shown below.

27

Scheme 6

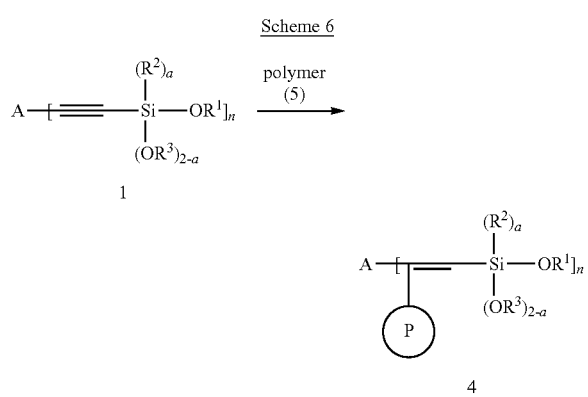

Reaction can be carried in a variety of solvents as described above and at room temperature or at elevated temperature.

The modified polymer can also be prepared according to the Scheme 7 shown below.

Scheme 7

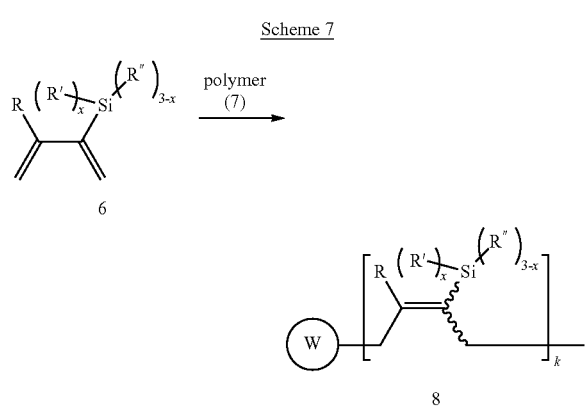

Reaction can be carried in a variety of solvents as described above and at room temperature or at elevated temperature.

One embodiment relates to the modified polymer of the present invention has 1,4-cis content of 15 to 99%, or of 20 to 99%, or of 25 to 99%, or of 30 to 99%, or of 35 to 99%, or of 40 to 99%, or of 45 to 99%, or of 50 to 99%, or of 55 to 99%, or of 60 to 99%, or of 65 to 99%, or of 70 to 99%, or of 75 to 99%, or of 80 to 99%, or of 85 to 99%, or of 90 to 99%, or of 95% to 99%.

Another embodiment relates to the modified polymer of the present invention has 1,4-cis content of 15 to 20%, or of 20 to 25%, or of 25 to 30%, or of 30 to 35%, or of 35 to 40%, or of 40 to 45%, or of 45 to 50%, or of 50 to 55%, or of 55 to 60%, or of 60 to 65%, or of 65 to 70%, or of 70 to 75%, or of 75 to 80%, or of 80 to 85%, or of 85 to 90%, or of 90 to 95%, or of 95% to 99%.

Another embodiment relates to the modified polymer of the present invention has more than 90% 1,4-cis content.

Another embodiment relates to the modified polymer of the present invention where the polymer is a polymer of 1,3-butadiene, isoprene, 2,3-dimethyl-1,3-butadiene, 1,3-pentadiene, 1,3-hexadiene, or myrcene. Another embodiment relates to the modified polymer of the present invention where the polymer is a polymer of isoprene.

28

Another embodiment relates to modified polymer prepared according to any of the methods described above.

Another aspect of the present invention relates to a composition comprising a modified polymer prepared according to any of the methods described above and a filler blended with the modified polymer.

Suitable fillers include carbon black and inorganic fillers, and the reinforcing filler is preferably at least one selected from the carbon black and inorganic fillers.

Suitable inorganic fillers include silica, aluminum hydroxide, clay, alumina, talc, mica, kaolin, glass balloon, glass beads, calcium carbonate, magnesium carbonate, magnesium hydroxide, calcium carbonate, magnesium oxide, titanium oxide, potassium titanate, and barium sulfate, and combinations thereof.

In one embodiment the filler is carbon black or silica.

Another aspect of the present invention relates to a rubber composition comprising a natural rubber; a modified polymer prepared according to any of the methods described above; and a filler.

The present invention may be further illustrated by reference to the following examples.

EXAMPLES

Example 1—Synthesis of 1,2-Bis(triethoxylsilyl)acetylene from Triethoxychlorosilane

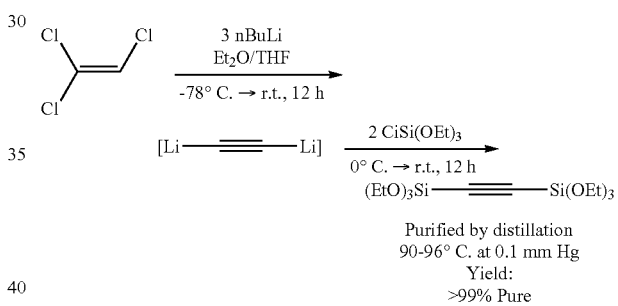

Freshly distilled trichloroethylene (from $CaCl_2/Na_2CO_3$; 1.4 mL, 15.7 mmol) and $Et_2O$ (15 mL) were cooled to $-78°$ C. 2.5 M nBuLi in hexane (18.8 mL, 47.7 mmol) was added via an addition funnel. The funnel was rinsed with THF (10 mL). After addition of nBuLi was complete, the white suspension was allowed to warm to ambient temperature, and the mixture was stirred for 8 hours. The reaction mixture was then cooled to 0° C., and $ClSi(OEt)_3$ (8 mL, 40.7 mmol) was added over 5 min. The mixture was allowed to stir at ambient temperature for approximately 18 hours. The precipitate was removed by filtration and washed with $Et_2O$ to provide a pale yellow solution. The volatiles are removed under vacuum. $(EtO)_3Si-C\equiv C-Si(OEt)_3$ was purified by vacuum distillation (90-96° C. at 0.1 mm Hg) to provide 3.85 g (11.0 mmol, 70% yield at >99% purity).

Example 2—Synthesis of 1,2-Bis(triethoxylsilyl)acetylene Using Acetylene and Tetraethyl Orthosilicate (TEOS)

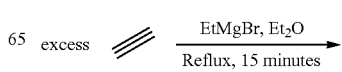

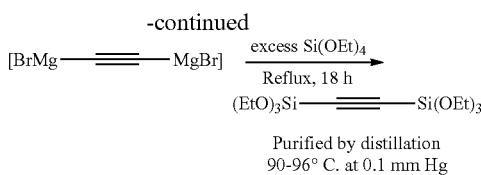

Purified by distillation
90-96° C. at 0.1 mm Hg

A three-neck round bottom flask was fitted with a gas bubbler, an addition funnel, and a reflux condenser. A 3.0 M EtMgBr (20 mL, 60 mmol) solution in Et$_2$O was diluted with Et$_2$O (75 mL). During addition of acetylene, evaporation of solvent occurred, so an additional 75 mL of Et$_2$O were placed in the addition funnel; this additional solvent was added over the course of the reaction to maintain solvent volume. The solution was heated to a reflux, and then acetylene was bubbled through the refluxing solution for approximately 5 minutes and Et$_2$O was slowly added to the mixture. The reaction mixture was cooled to room temperature, and tetraethyl orthosilicate (TEOS; 13.5 mL, 60.6 mmol) was added. This mixture was heated at reflux for 18 hours. The mixture was allowed to cool, filtered to remove the salts which were washed with Et$_2$O, to yield a pale yellow solution. Volatiles were removed under vacuum. (EtO)$_3$Si—C≡C—Si(OEt)$_3$ was purified by vacuum distillation (1.10 g, 3.1 mmol, 5.2% yield at 96% purity; the yield can be improved with optimization).

Example 3—General Synthesis

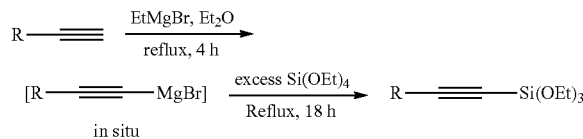

A two-necked round bottom flask was fitted with a reflux condenser and an addition funnel and charged with the appropriate alkyne and diethyl ether to generate ~1.0 M solution. EtMgBr was added to the solution in a dropwise fashion through the addition funnel at room temperature. Upon completion of the addition, the mixture was heated at reflux for approximately 2 hours, and then the reaction was allowed to cool to ambient temperature. TEOS was added via syringe at room temperature, and the mixture was again heated at reflux for approximately 18 hours. The mixture was filtrated, and the salt precipitates were extracted with Et$_2$O. The volatile materials were removed under vacuum to provide a crude mixture of products, which were separated and isolated by fractional distillation.

Exemplary compounds prepared by this method are shown in Scheme 8.

Scheme 8

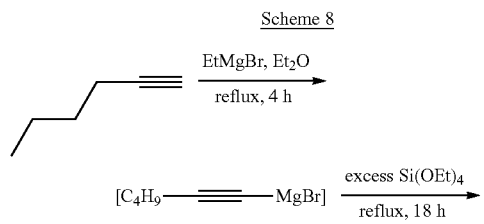

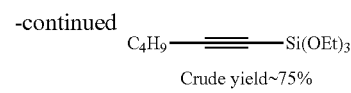

Crude yield~75%

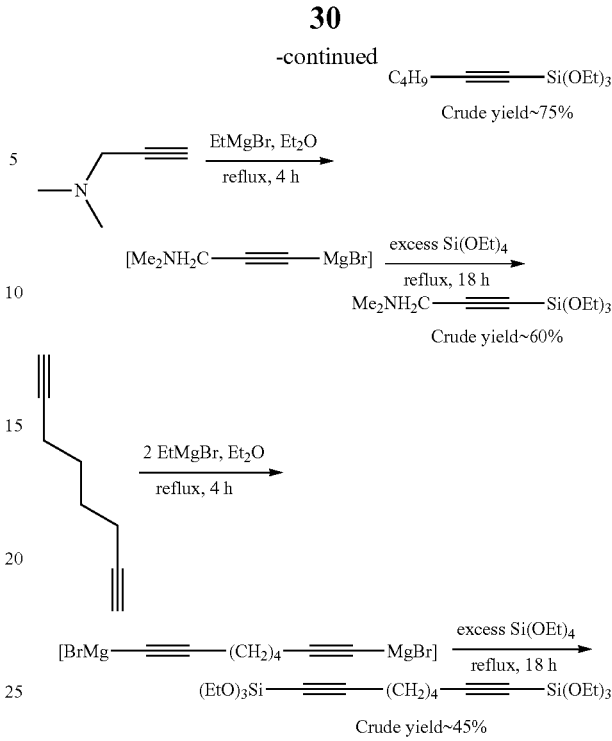

Example 4—Polymerization of 1,3-Butadiene

Neodymium versatate (NdV4), triisobutyl aluminum (TBA), diisobutylaluminum hydride (DIBALH), and diisobutyl aluminum chloride (DIBAL-Cl) were 0.6, 8.9, 19.4 and 2.0 wt % of heptane solution respectively. The molar proportion of the each components was 1:20:10:2 and catalyst level was 0.1 mmole of neodymium per 100 g of 1,3-butadiene.

Neodymium versatate (NdV4) was prepared according to Kwag, "A Highly Reactive and Monomeric Neodymium Catalyst," *Macromolecules* 35:4875-4879 (2002), which is hereby incorporated by reference in its entirety.

Heptane (1800 g) was placed in oxygen and moisture free 5 L autoclave reactor filled with N$_2$ and brought to a desired temperature at around 70° C. To the stirred heptane solution were added NdV4, butadiene, TIBA, DIBALH, and DIBAL-Cl, respectively. Then 1,3-butadiene (300 g) was added to the stirred solution of reaction mixture and the polymerization reaction was carried out at 70° C. for 2 hours. The polymerization reaction was terminated by adding ethanol (1.5 g) and 6-di-tert-butyl 4-methylphenol (1.5 g). The final product was dried in vacuo. Conversion was calculated from the wt % of isolated polymer compared to the initial charge of monomer. (conv. >95%).

Example 5—Preparation of Alkynylsilane End Terminated 1,4-Polybutadiene

NdV4, TIBA, DIBALH, and DIBAL-Cl were 0.6, 8.9, 19.4, and 2.0 wt % of heptane solution, respectively. The molar proportion of the components was 1:20:10:2 and catalyst level was 0.1 mmole of neodymium per 100 g of 1,3-butadiene.

Heptane (1800 g) was placed in in oxygen and moisture free 5 L autoclave reactor filled with N$_2$ and brought to a desired temperature at around 70° C. To the stirred heptane solution, were added NdV4, butadiene, TIBA, DIBALH, and DIBAL-Cl, respectively. Then 1,3-butadiene (300 g) was added to the stirred solution of reaction mixture and the polymerization reaction was carried out at 70° C. for 2 hours. Then, after adding alkynylsilane, 1,2-bis(triethoxylsilyl)acetylene dissolved in heptane (10 mL) (0.2 part by weight based on 100 parts by weight of butadiene) was added as an end terminating agent. The mixture was stirred at 70° C. for 1 hour. The polymerization reaction was terminated by adding ethanol (1.5 g) and 6-di-tert-butyl 4-methylphenol (1.5 g). The final product was dried in vacuo. Conversion was calculated from the wt % of isolated polymer compared to the initial charge of monomer. (conv. >95%).

Example 6—Gel Permeation Chromatography (GPC) and Mooney Viscosity Analysis

Molecular analysis was carried out with gel permeation chromatography (GPC). The results are shown in Table 1 and FIG. 1. Each GPC diagram resulted in distinct pattern showing a high molecular weight region because alkynylsilane moieties were bound to polymer chain ends. Blue line is for 1,4-polybutadiene obtained in Example 4 and black line is for alkynylsilane end terminated 1,4-polybutadiene obtained in Example 5.

TABLE 1

|  | Mn | Mn | PDI | Mz | Mp | MV (Mooney viscosity) |
|---|---|---|---|---|---|---|
| Example 4 | 263 | 578 | 2.2 | 1434 | 423 | 32 |
| Example 5 | 281 | 751 | 2.7 | 2663 | 417 | 38 |

Mooney viscosity analysis was carried out by rotary viscometer (Alpha Technology, Mooney MV2000). High Mooney viscosity was obtained for polymer obtained in Example 5, which was terminated with the alkynylsilanes. It was confirmed that high molecular weight region and molecular weight distribution increased in the polymer obtained in Example 5 in GPC as a coupling reaction of alkynylsilane binding to 1,4-polybutadiene chain ends.

Example 7—Measurement of Physical Properties of Rubber Compound

High cis-1,4-polybutadiene and end terminated high cis-1,4-polybutadiene (Examples 4 and 5, hereinafter referred to as BR) were mixed at 120° C. using a 500 cc Brabender according to the composition shown in Table 2 below. The mixture was blended at 80° C. using a roll mill. Then, the mixture was subjected to vulcanization at 160° C. using a press for a time period measured by RPA. And the measured physical properties are shown in Table 3 below. Physical properties increased with polymer obtained in Example 5 which was observed that abrasion (DIN), 100%, 300% modulus, tensile strength and elongation at break was improved compared to polymer obtained in Example 4 due to alkynylsilane moieties binding to polymer chain ends to assist to disperse silica fillers well during rubber compound processing.

TABLE 2

|  | Example 4 | Example 5 |
|---|---|---|
| SSBR (KKPC 5360H) | 80.0 | 80.0 |
| Example 1. | 20.0 | 0 |
| Example 2. | 0 | 20.0 |

TABLE 2-continued

|  | Example 4 | Example 5 |
|---|---|---|
| Silica (Uracil 7000GR ®) | 80.0 | 80.0 |
| Coupling agent (X50-S ®) | 12.8 | 12.8 |
| TDAE (rubber processing oil) | 25.0 | 25.0 |
| ZnO (zinc oxide) | 3.0 | 3.0 |
| St-A (stearic acid) | 2.0 | 2.0 |
| 6PPD (N-1,3-dimethylbutyl)-N-phenyl-p-phenylenediamine) | 1.0 | 1.0 |
| Sulfur | 1.5 | 1.5 |
| CBS (N-Cyclohexylbenzothiazol-2-sulphenamide) | 1.8 | 1.8 |
| DPG (1,3-Diphenylguanidine) | 1.8 | 1.8 |

Unit: phr (part by weight based on 100 parts by weight of rubber)

TABLE 3

|  | Example 4 | Example 5 |
|---|---|---|
| Raw Mooney viscosity | 32 | 38 |
| Compound Mooney viscosity | 83.4 | 85.1 |
| Hardness (Shore A) | 75 | 75 |
| Abrasion (DIN) | 0.0873 | 0.0812 |
| Tanδ at 0° C. | 0.355 | 0.355 |
| Tanδ at 60° C. | 0.108 | 0.110 |
| Tanδ at 70° C. | 0.101 | 0.103 |
| 100% modulus (kgf/cm$^2$) | 35.9 | 38.1 |
| 300% modulus (kgf/cm$^2$) | 145.8 | 150.1 |
| Tensile strength (kgf/cm$^2$) | 169.3 | 192.4 |
| Elongation at break (%) | 340.6 | 383.9 |

Example 8—Polyisoprene Analyzed by DOSY NMR $Nd(O_2C_{10}H_{19})_3(HO_2C_{10}H_{19})$ (NdV4, 0.010 g, 0.011 mmol) was dissolved in toluene (1.00 mL) and transferred to a J-Young-style NMR tube equipped with a Teflon valve. The aluminum alkyl reagents triisobutyl aluminum (TIBA, 0.014 mL, 0.059 mmol), diisobutyl aluminum hydride (DIBAL-H, 0.006 mL, 0.034 mmol), and diisobutyl aluminum chloride (DIBAL-Cl, 0.003 mL, 0.015 mmol) were added. The isoprene (0.120 g, 1.75 mmol) was then added and the J-Young tube was sealed. The reaction was heated at 60° C. for 90 min to consume the isoprene. $(EtO)_3Si-C≡C-Si(OEt)_3$ (0.041 g, 0.11 mmol) was added to the toluene solution and reacted at 60° C. for 3 hours. The polymeric product was precipitated by addition to methanol, isolated by filtration, and dried under vacuum. The resulting polymer was analyzed by NMR.

In experiments when silylalkyne was added at ~50% conversion of monomer, complete inhibition of polymerization was observed. This suggested that the alkyne binds active sites and inhibits polymerizations.

Example 9—DOSY Experimental Description

Figure 2:
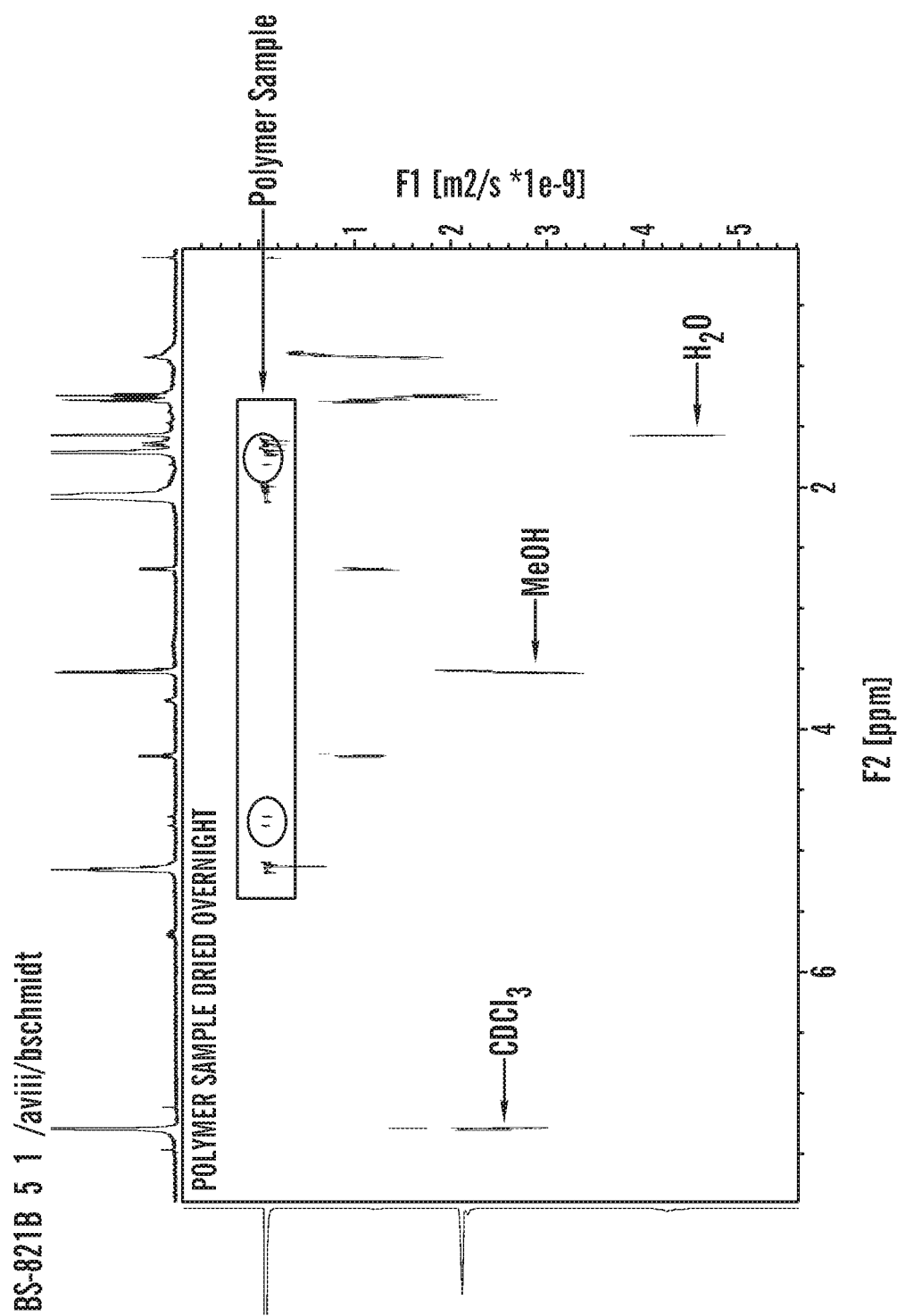
FIG. 2 shows a DOSY NMR of isolated product.

Samples were prepared by weighing 10-20 mg of polymer sample in a test tube and dissolving for 15 minutes in ~0.6 mL $CDCl_3$. NMR experiments were run on either Bruker DRX 400 MHz or Bruker avii 600 MHz instrument. For each experiment the D20 parameter was optimized to fit the gradient window of 2%-95% typically falling in the range of 0.05-0.15. In the example shown in FIG. 2, the following optimized parameters were used: D20=0.70, ns=32, and 64 steps through gradient (D20 is the diffusion delay parameter in the DOSY sequence). The signals in the range of ~1.65 ppm were identified as incorporated —Si(OEt)$_x$ which diffused at the same rate as the bulk polymer, suggesting covalent linking. This example showed that (EtO)$_3$Si—C≡C—Si(OEt)$_3$ can be used as an end-group functionalizing agent.

Example 10—Quenching Polyisoprene Reactions with Silylalkynes

Polymerizations of isoprene are carried out as shown below:

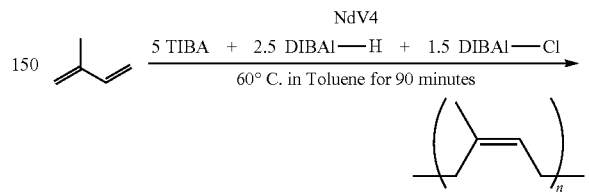

Figure 3:
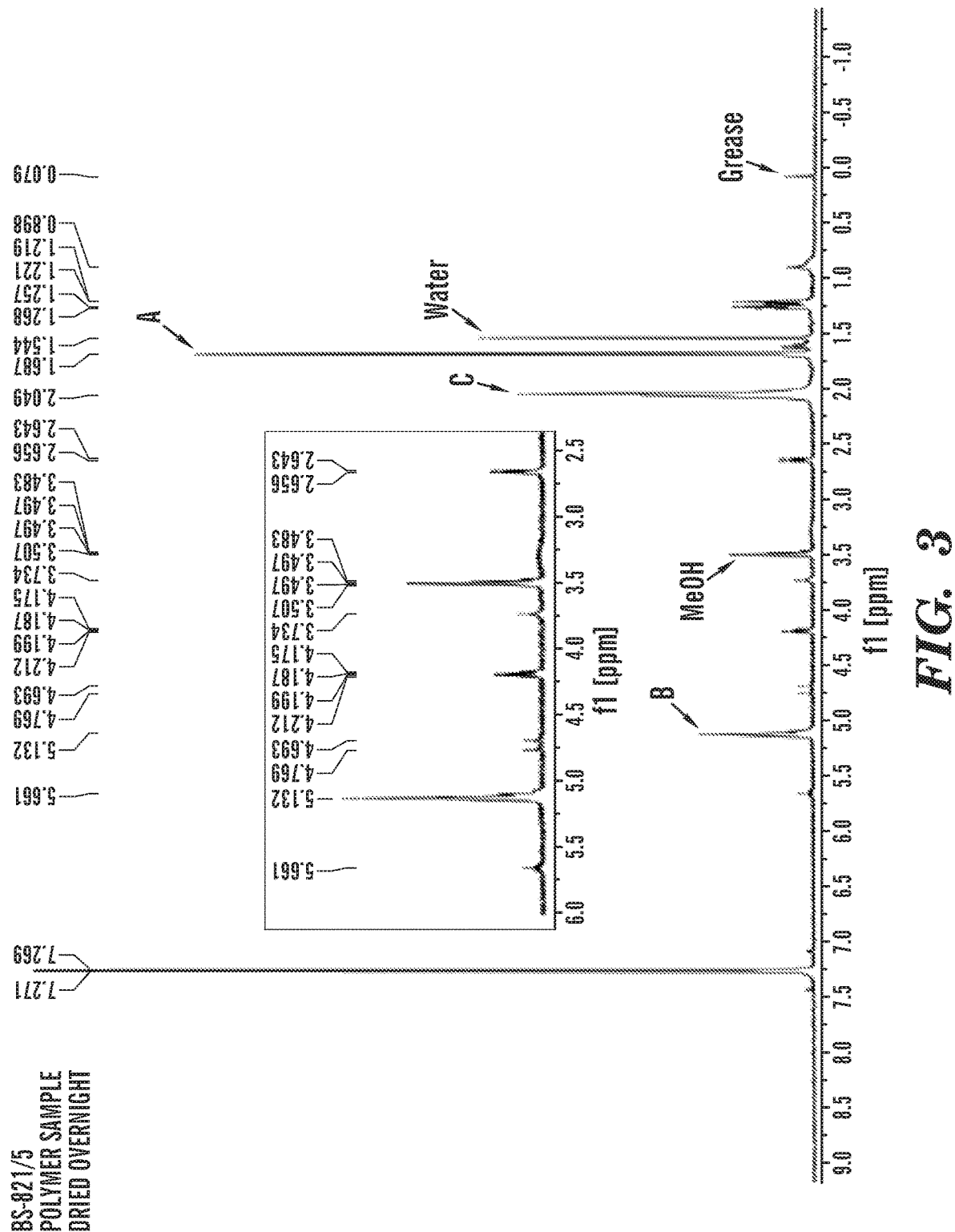
FIG. 3 shows $^1$H NMR spectra of polyisoprene synthesized from catalysis using $NdV_4$, 5 TIBA, 2.5 DIBAl—H, and 1,5 DIBAl—Cl, quenched with $(EtO)_3SiCCSi(OEt)_3$.
Figure 4:
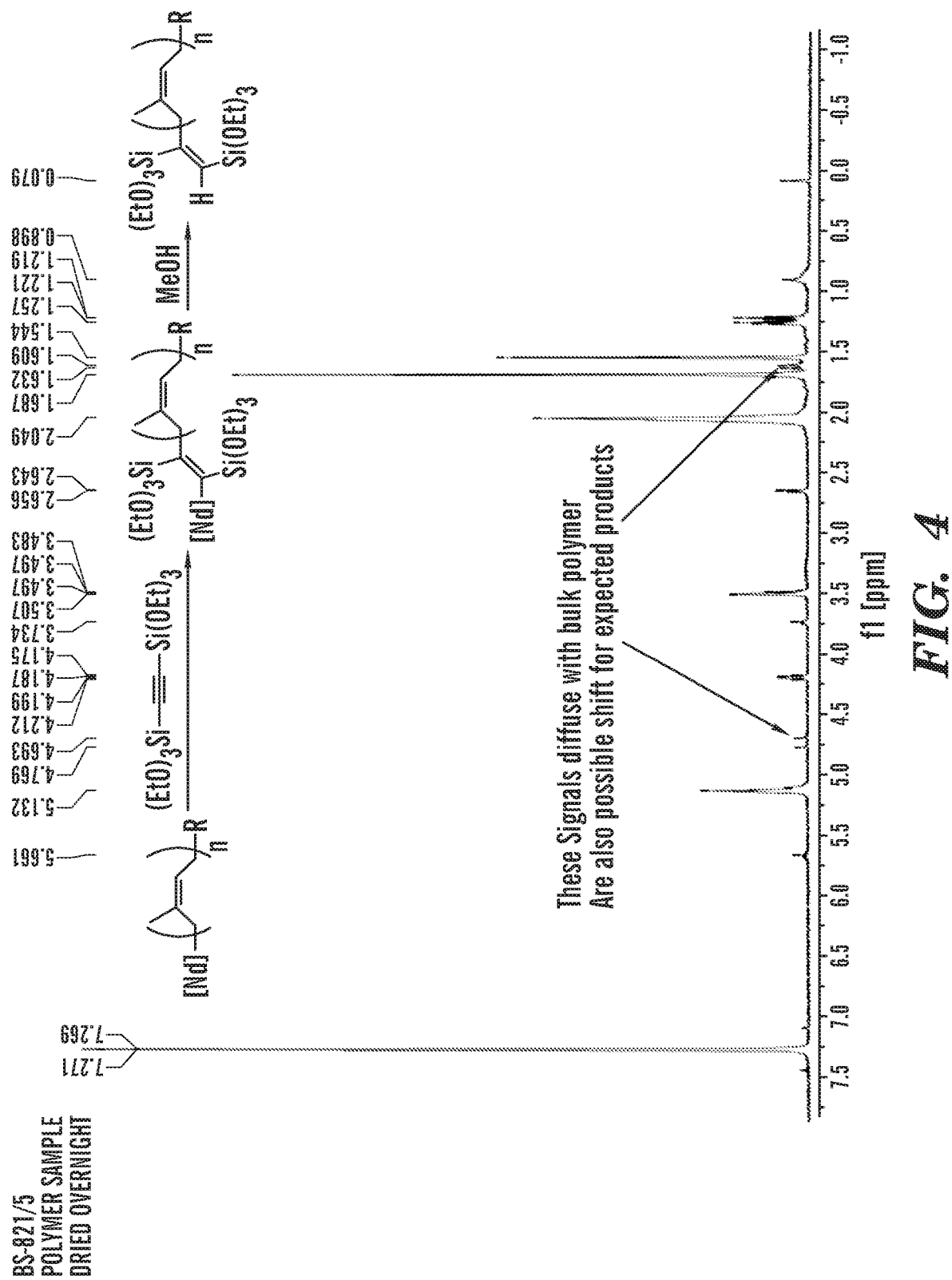
FIG. 4 shows $^1$H NMR spectra for the $(EtO)_3SiCCSi(OEt)_3$ derivatized polyisoprene.

After completion of the polymerization silylalkyne of interest was added and the polymer was analyzed by NMR characteristics such as $^1$H correlation (COSY, HSQC) and Diffusion based (DOSY) experiments (FIGS. 3 and 4).

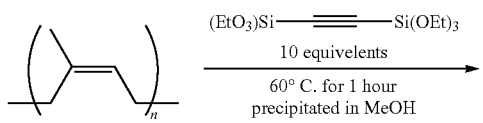

Results from these experiments showed evidence of (EtO)$_3$Si—C≡C—Si(OEt)$_3$ bound to the bulk polymer sample. This evidence was supplied by the diffusion of peaks of interest matching that of the bulk polymer samples.

In experiments when silylalkyne was added at approximately 50% conversion of monomer complete inhibition of polymerization was observed. This suggested that the alkyne binds active sites and inhibits polymerizations.

Example 11—Synthesis of Functionalized Dienes

The synthesis of functionalized dienes can be accomplished through a variety of methods; for example, Grignard reactions with chloroprene (Pidaparthi et al., "Preparation of 2-Trialkylsiloxy-Substituted 1,3-Dienes and Their Diels-Alder/Cross-Coupling Reactions," *Org. Lett.* 9:1623-1626 (2007); Pidaparthi et al., "Preparation of 2-Silicon-Substituted 1,3-Dienes and Their Diels-Alder/Cross-Coupling Reactions," *J. Org. Chem.* 74:8290-8297 (2009), which are hereby incorporated by reference in their entirety), E-H bond activation with ene-ynes (Backvall et al., "Palladium-Catalyzed Regioselective Addition of Thiophenol to Conjugated Enynes. Efficient Syntheses of 2-(Phenylsulfinyl) and 2-(Phenylsulfonyl) 1,3-Dienes," *J. Org. Chem.* 59:5850-5851 (1994), which is hereby incorporated by reference in its entirety), reduction of 1,4-dichloro-2-X-2-butene (European Patent Application No. 0154867 to Sato; European Patent Application No. 0189174 to Sato et al.; Sato et al, "New Silane Coupling Agents with the Buta-1,3-diene Moiety," *Chem. Ind.* 20:743-744 (1984), which are hereby incorporated by reference in their entirety), or ene-yne metathesis (Junker et al, "Synthesis of 4-Aryl- and 4-Alkyl-2-silyl-1,3-butadienes and Their Diels-Alder/Cross-Coupling Reactions," *J. Org. Chem.* 75:8155-8165 (2010); Giessert et al., "Ethylene-Promoted Intermolecular Enyne Metathesis," *Org. Lett* 5:3819-3822 (2003); Diver et al, "Metathesis," Grela, *Olefin Metathesis: Theory and Practice*, John Wiley & Sons, pp. 153 (2014), which are hereby incorporated by reference in their entirety) (Scheme 9). Precursors could also provide 2-substituted dienes, increasing the propensity for η$^4$-coordination and 1,4-insertions during transition metal based coordination-polymerizations.

Scheme 9
Routes to Functionalized Dienes

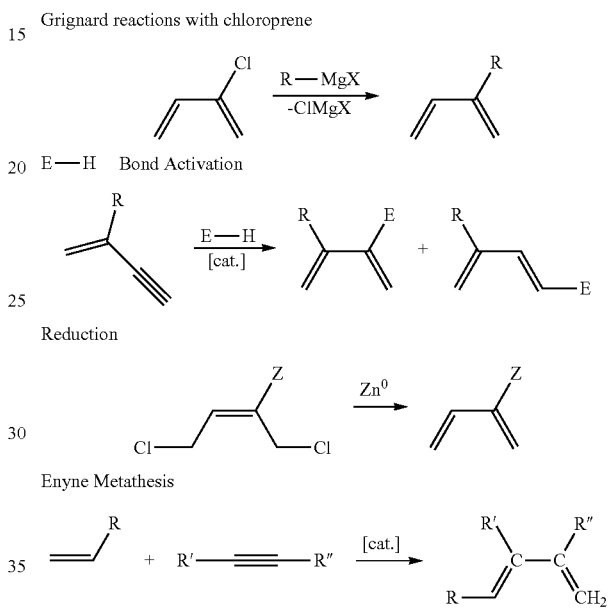

Example 12—Synthesis of 2-Silyl-Butadienes via Reduction of 1,4-Dichloro-2-silyl-2-butenes

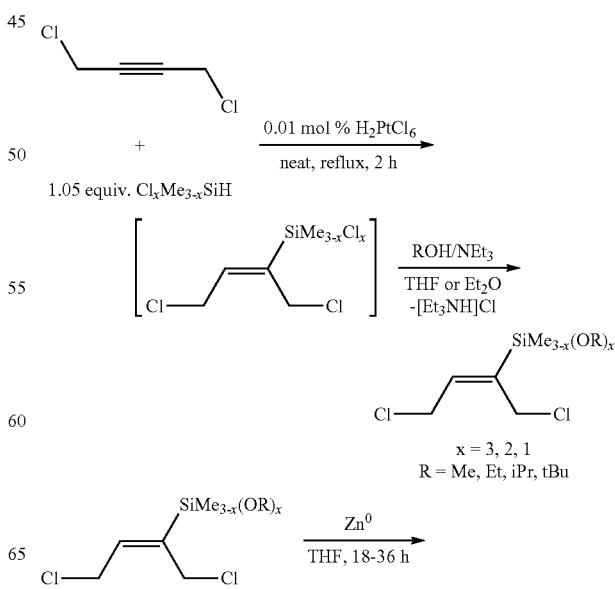

-continued

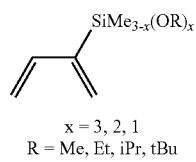

x = 3, 2, 1
R = Me, Et, iPr, tBu

In the first step, the neat reaction was carried out in a flask with a large head space and fitted with a reflux condenser due to the violent reflux observed after initiation of hydrosilylation, which was achieved by slowly raising the temperature to 35-45° C. This crude liquid hydrosilylation product was then added to a THF solution of ROH/Et$_3$N to yield 1,4-dichloro-2-silyl-2-butene compounds. After extraction from ammonium salts, compounds were isolated in ~90% yields at 80-90% purity. The crude products were used further without further purification.

Figure 5:
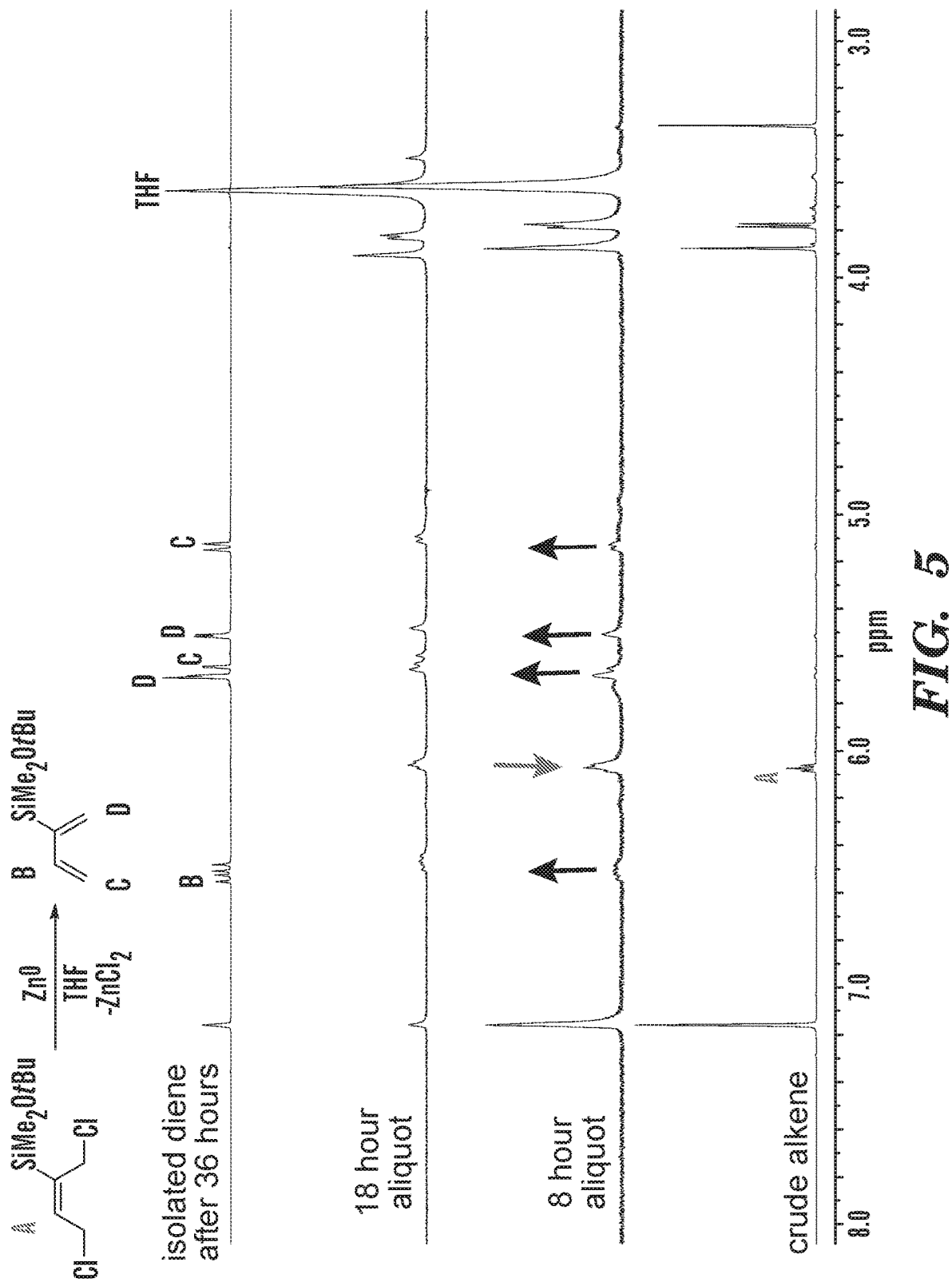
FIG. 5 shows $^1$H NMR analysis of reaction progress for the reduction of 1,4-dichloro-2-dimethyltertbutoxysilyl-2-butene with zinc

Reductions of the resulting functionalized alkenes were carried out in THF at room temperature over 18-36 hours. The reaction worked most efficiently with a ~50:50 mixture of metallic zinc and powered zinc that was activated by washing with 6 M HCl (3×10 mL), water (5×10 mL), and ethanol (3×5 mL) then dried at 120° C. under vacuum overnight. Aliquots of the reaction mixture were taken periodically and reaction was considered complete when the triplet (A) of the butene (FIG. 5) was fully consumed. A quartet and two sets of doublets are characteristic signals for the butadiene complexes followed during the reaction (FIG. 5). When the zinc reductions stalled (i.e. conversion was slow or stopped) or white precipitate formed, additional THF was added to dilute the reaction and solubilize ZnCl$_2$ from metallic zinc surfaces. Due to the steric bulk the 2-(Me$_2$tBuOSi)-1,3-butadiene was of particular interest and to the best of our knowledge has not been reported and characterized.

Figure 6:
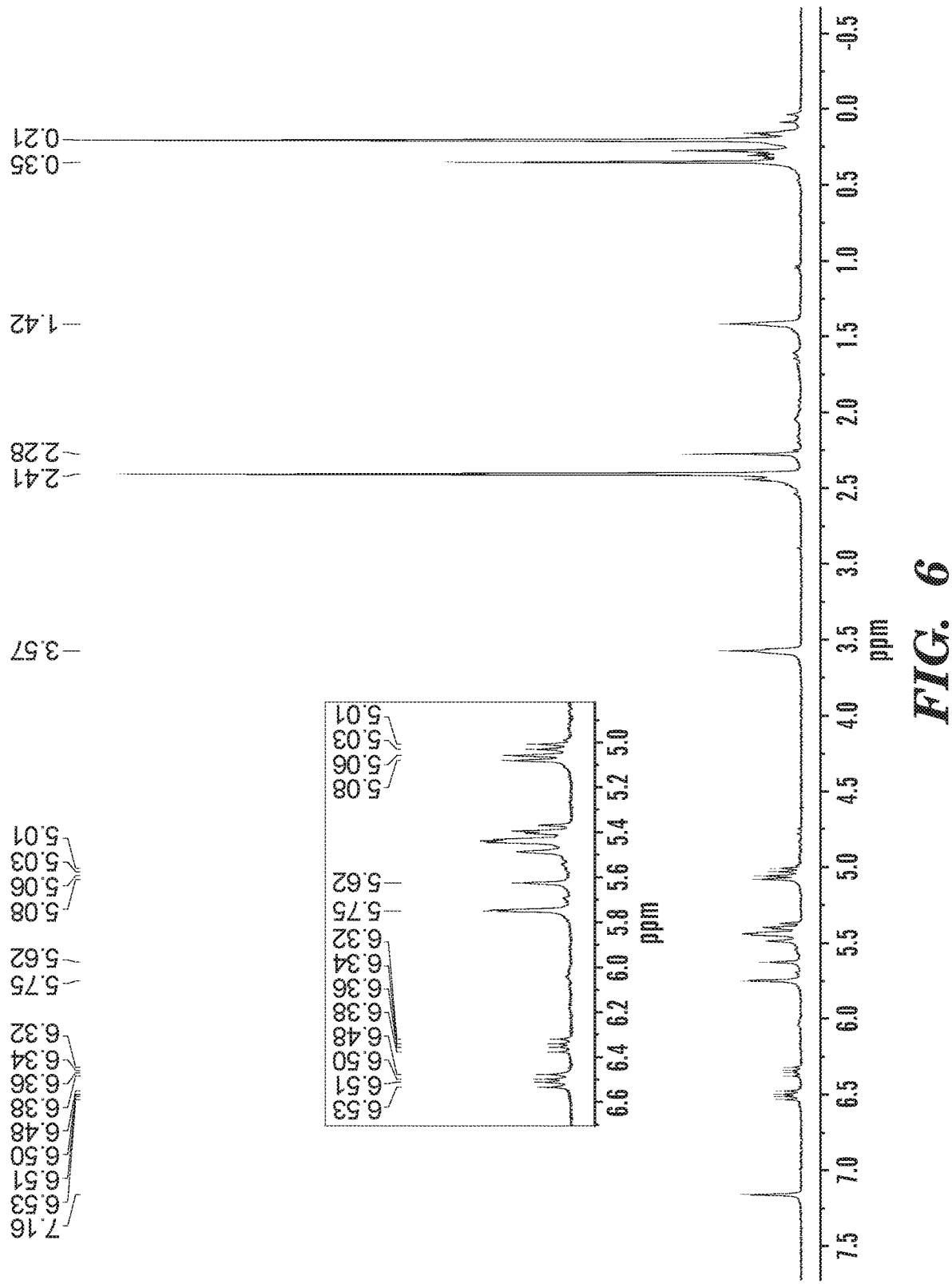
FIG. 6 shows $^1$H NMR of 2-$Me_2SiNMe_2$-1,3-butadiene partially decomposed in benzene-$d_6$.

Silazane functionalized dienes were synthesized via the reduction method. The dichloro-butene compound containing the Si—NMe$_2$ functional group was found to decompose quickly and reductions were carried out in situ. Likewise, the dichloro-butene compound containing the Si—NiPr$_2$ functional group was found to decompose quickly and reductions were carried out in situ. 2-(Me$_2$NMe$_2$Si)-1,3-butadiene was also found to be reactive, even when stored under a N$_2$ atmosphere at −40° C. $^1$H NMR in benzene-d$_6$ indicated that removal of the solvent under reduced pressure accelerated decomposition (FIG. 6). In general, 2-silazido-butadienes of the type 2-(R$_2$N)R'$_2$Si—C$_4$H$_5$ are accessible via this method.

Example 13—Synthesis of Functionalized Dienes via Ruthenium Catalyzed Enyne Metathesis Enyne metathesis reactions utilizing Hoveyda-Grubbs $2^{nd}$ Generation catalyst and ethylene to obtain 2- and 2,3-substituted dienes were successful in synthesizing compounds of interest. It was found that individual compounds required specific reaction conditions for optimized yields. Optimized conditions for enyne metathesis reactions containing functional groups is shown in Scheme 10. For example, the internal alkyne nBu-CC—Si(OEt)$_3$ was converted to the 2,3-substituted butadiene with high conversions by intermolecular enyne metathesis under the reaction conditions of 1 mol % [Ru], 80 psi ethylene in methylene chloride at 60 C for 1 hour. More challenging terminal alkynes require more forcing conditions. To obtain complete conversion of Me$_2$Si(NiPr$_2$)CCH to the corresponding 2-substituted diene, ethylene pressures of 40 bar and slow addition of catalyst were required to obtain acceptable conversions. In addition, intramolecular enyne metathesis generated 1,2-substituted dienes.

Scheme 10

Intermolecular Enyne Metathesis with ethylene

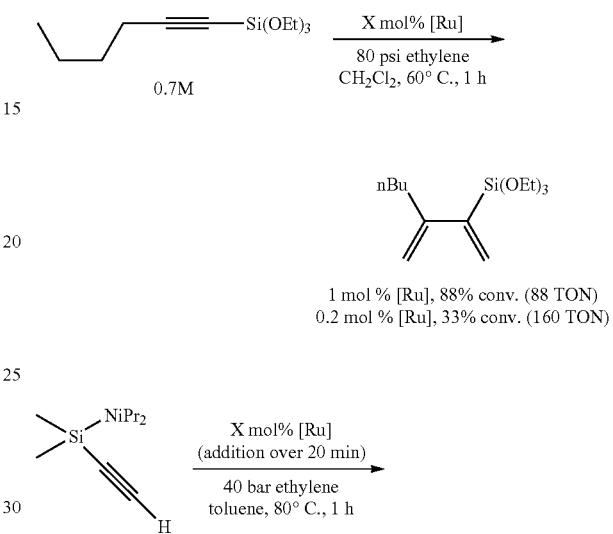

1 mol % [Ru], 88% conv. (88 TON)
0.2 mol % [Ru], 33% conv. (160 TON)

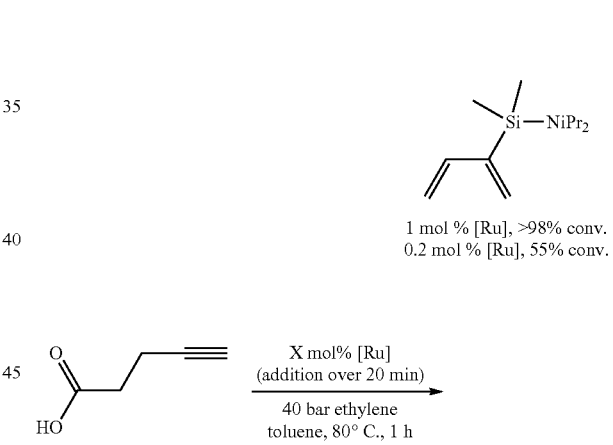

1 mol % [Ru], >98% conv.
0.2 mol % [Ru], 55% conv.

2 mol % [Ru], 75% conv.

Intermolecular Enyne Metathesis with ally siloxy compounds

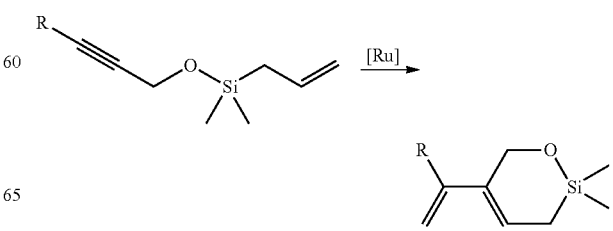

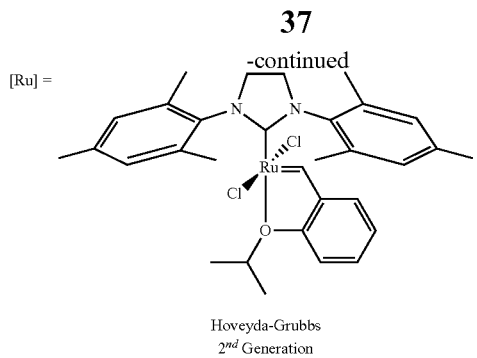

[Ru] =

Hoveyda-Grubbs
2$^{nd}$ Generation

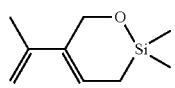

95% conv.
1.25 mol % [Ru]
CH$_2$Cl$_2$, 30 min.

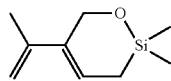

50% conv.
2 mol % [Ru]
CH$_2$Cl$_2$, 60° C., 1 h

Example 14—Co-Polymerization with Isoprene

Functionalized monomers were tested for co-polymerization with isoprene by polymerizing isoprene using a neodymium verstate catalyst (NdV4) and a mixture of triisbutyl aluminum, diisobutyl aluminumhydride, and diisobutyl aluminum chloride. Typically, these experiments were performed in the following manner: isoprene was polymerized under standard conditions (NdV4, TIBA, DIBALH, DIBAL-Cl, heptane) at room temperature for 1 hour (time required for full conversion of isoprene) to give polyisoprene. Next, the addition of the functionalized monomer was added to the reaction mixture, stirred for an additional 1 hour, and then the reaction mixture was quenched with methanol. The polymer was isolated by precipitation and exhaustive washing.

Representative Example A

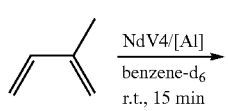

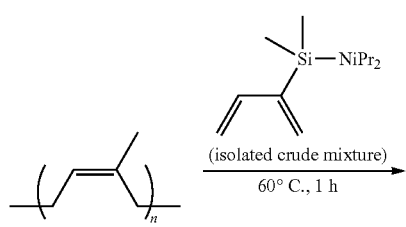

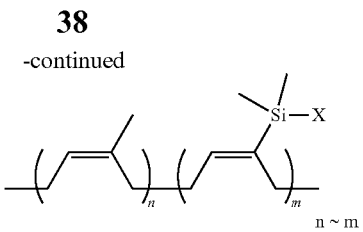

NdV4 = Nd(versatate)$_3$(verstic acid) (1 equiv.)
[Al] = triisobutyl aluminum TIBA (10 eqiv.)
diisobutyl aluminum hydride DIBAl—H (3 equiv.)
diisobutyl aluminum chloride DIBAl—Cl (1.5 equiv.)

Figure 7:
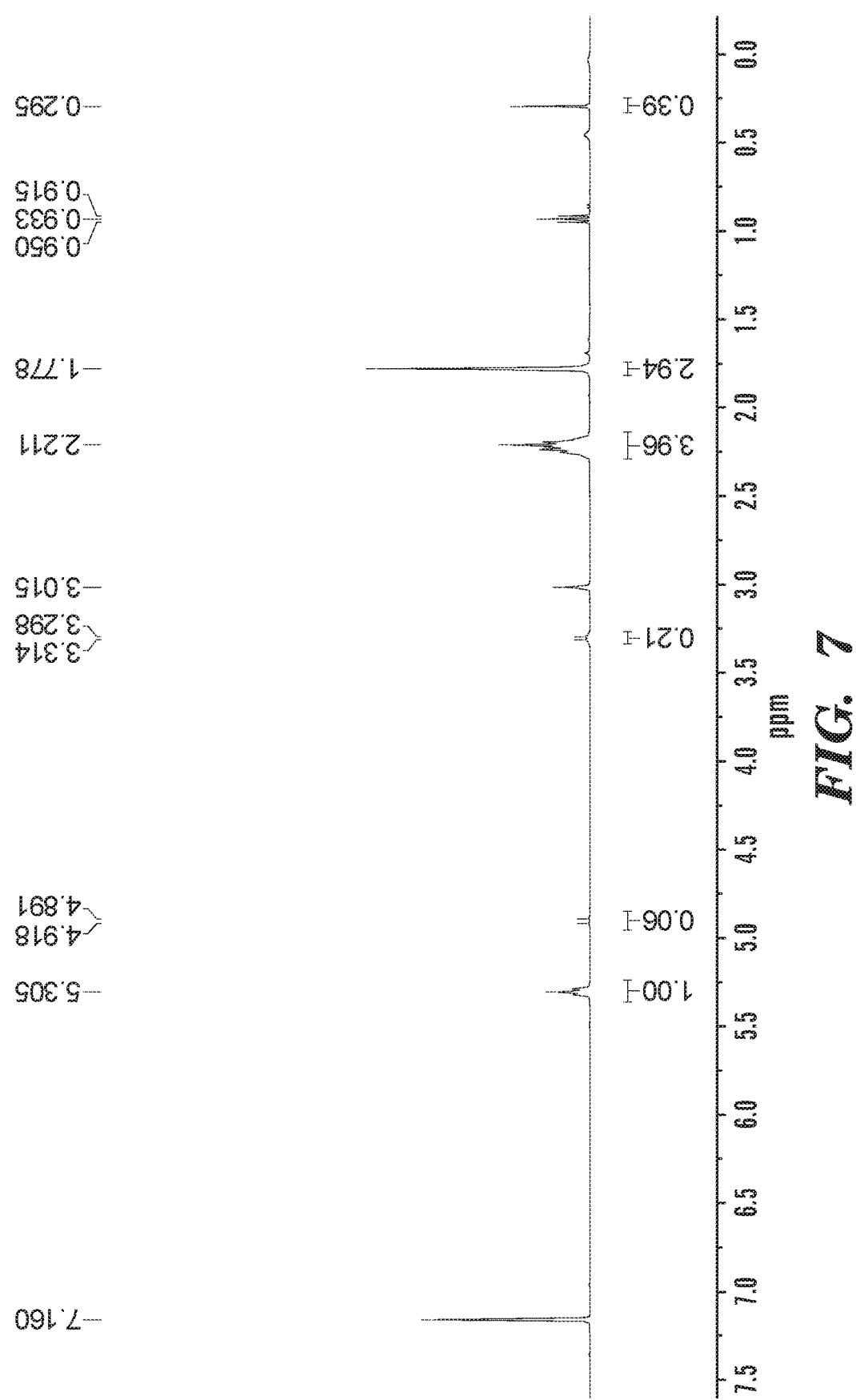
FIG. 7 shows $^1$H NMR of the isolated copolymer material.
Figure 8:
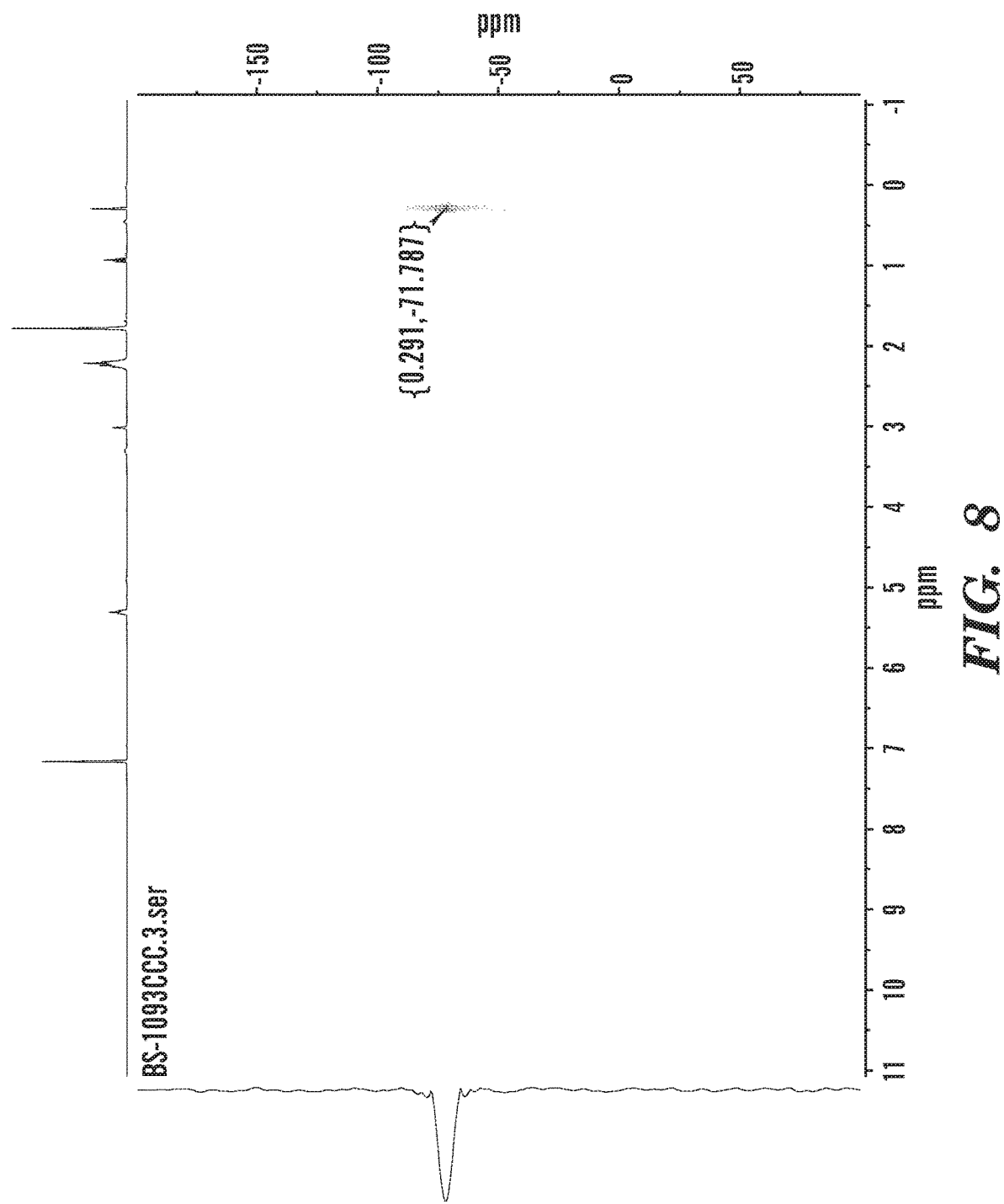
FIG. 8 shows $^{29}Si\{^1H\}$ HMBC NMR of isolated co-polymer material.
Figure 9:
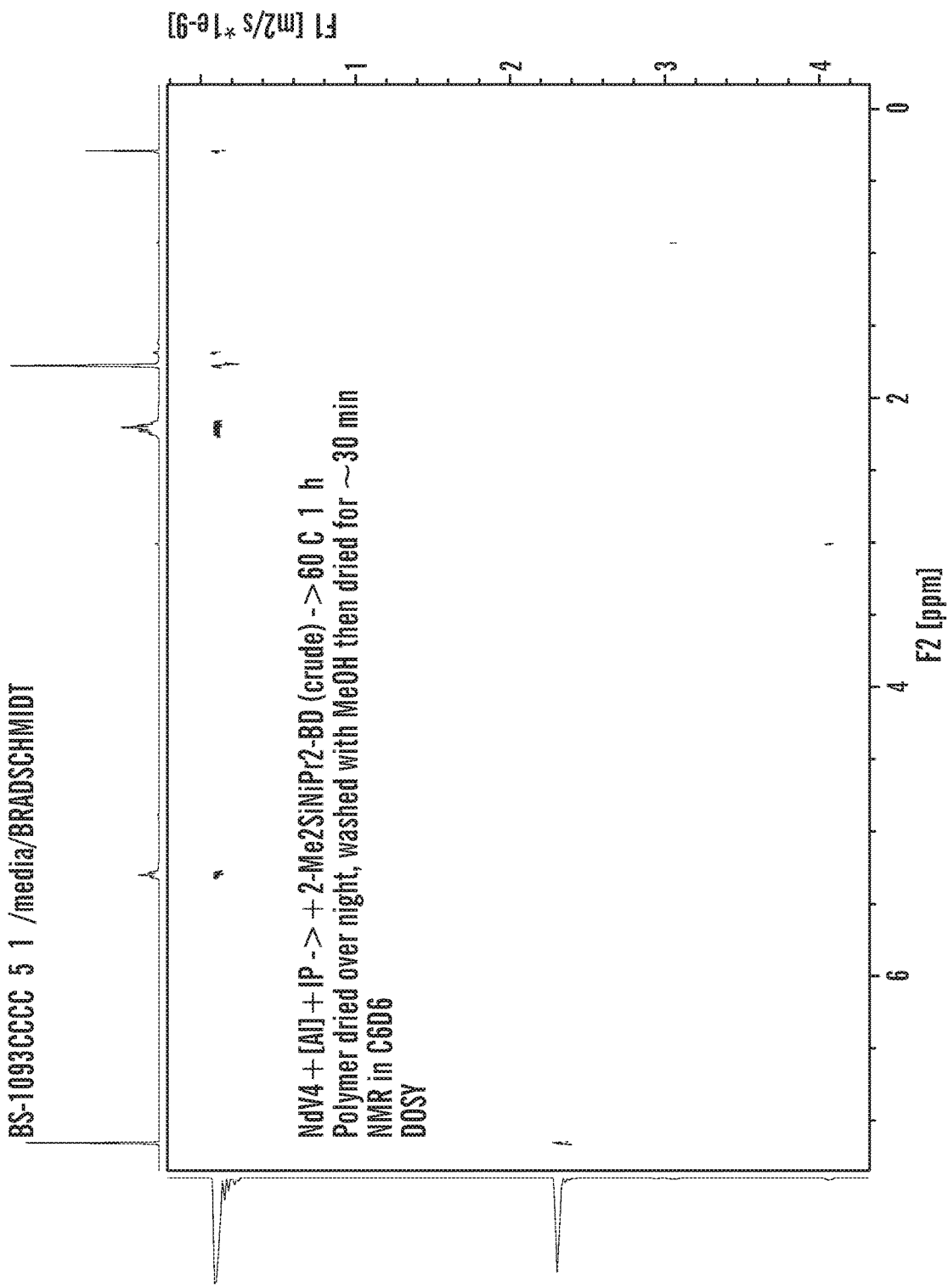
FIG. 9 shows DOSY NMR of isolated co-polymer material.

NdV4 (0.010 g, 0.011 mmol) was stirred with TIBA (0.022 g, 0.110 mmol), DIBAl—H (0.005 g, 0.033 mmol), and DIBAl—Cl (0.003 g, 0.017 mmol) in 0.6 mL of benzene-d$_6$ for 5 minutes to generate a pale-teal solution. Isoprene (0.1 g, 1.5 mmol) was added to the solution in a J-young tube and full conversion to polyisoprene was observed within 15 minutes at room temperature. Crude, distilled 2-2-(iPr$_2$NMe$_2$Si)-1,3-butadiene ((~0.1 g, colorless liquid containing no [Ru]) was added to the reaction and heated at 60° C. for 1 hour. After this time, signals in the diene region of $^1$H NMR spectrum were gone. The reaction mixture was quenched with methanol (1 mL) and dried overnight. Subsequent washing with methanol and drying yielded the co-polymer material. $^1$H NMR spectra and $^{29}$Si{$^1$H} HMBC experiments indicated the presence of polyisoprene with $^1$H NMR peaks at 5.3, 2.2, 1.8 ppm and Si—Me signal at 0.3 ppm (FIGS. 7 and 8). DOSY NMR of the co-polymer material indicated that Si—Me signal was covalently attached to the polyiosprene polymer by matching diffusion rates (FIG. 9).

Representative Example B

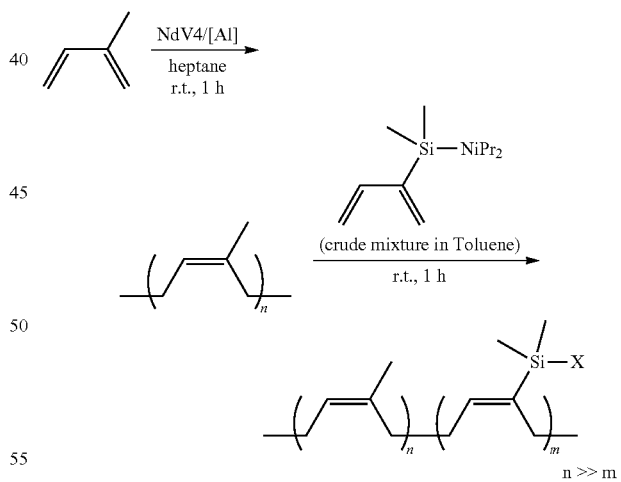

NdV4 = Nd(versatate)$_3$(verstic acid) (1 equiv.)
[Al] = triisobutyl aluminum TIBA (20 eqiv.)
diisobutyl aluminum hydride DIBAl—H (5 equiv.)
diisobutyl aluminum chloride DIBAl—Cl (1.5 equiv.)

Figure 10:
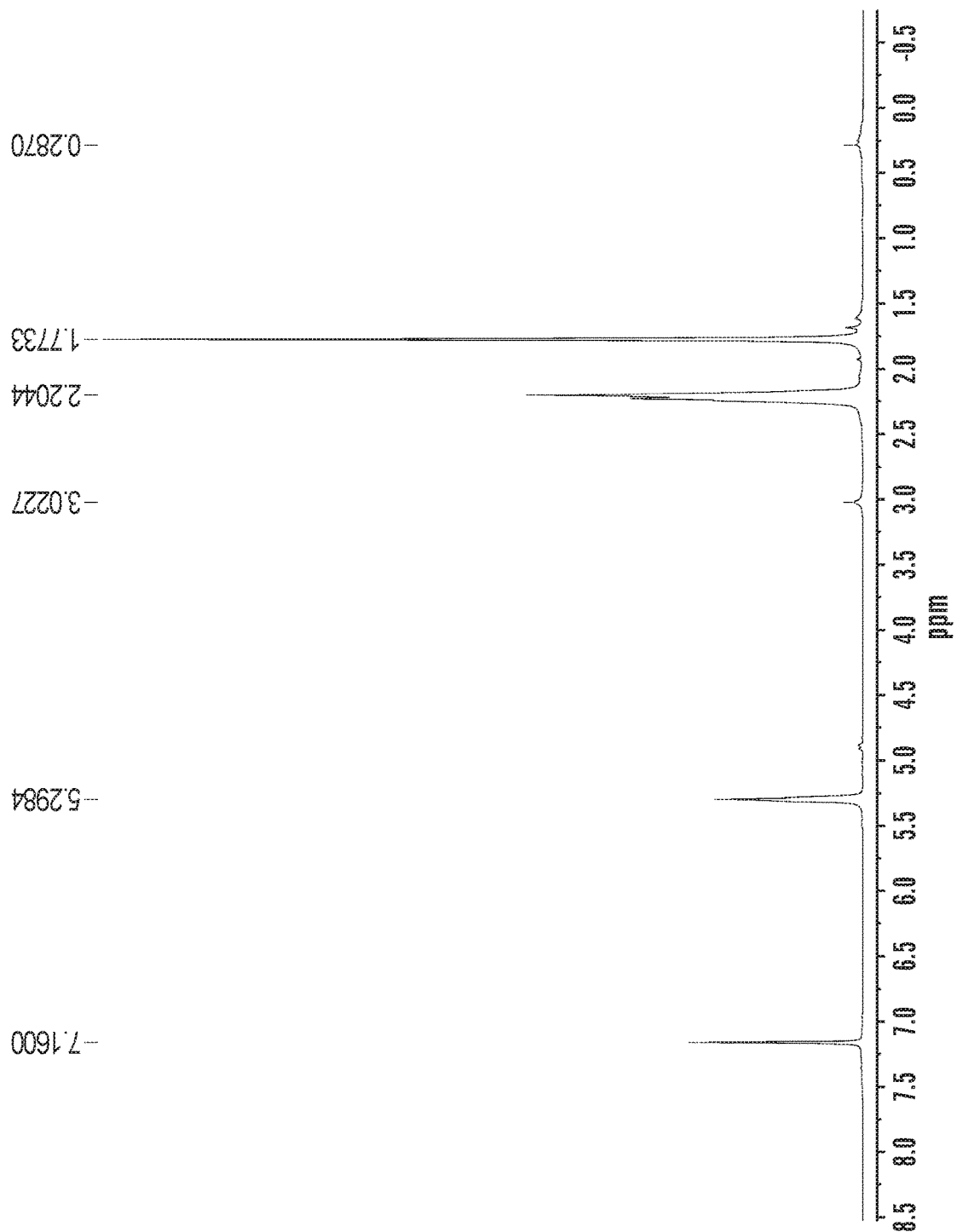
FIG. 10 shows $^1$H NMR of isolate co-polymer material.
Figure 11:
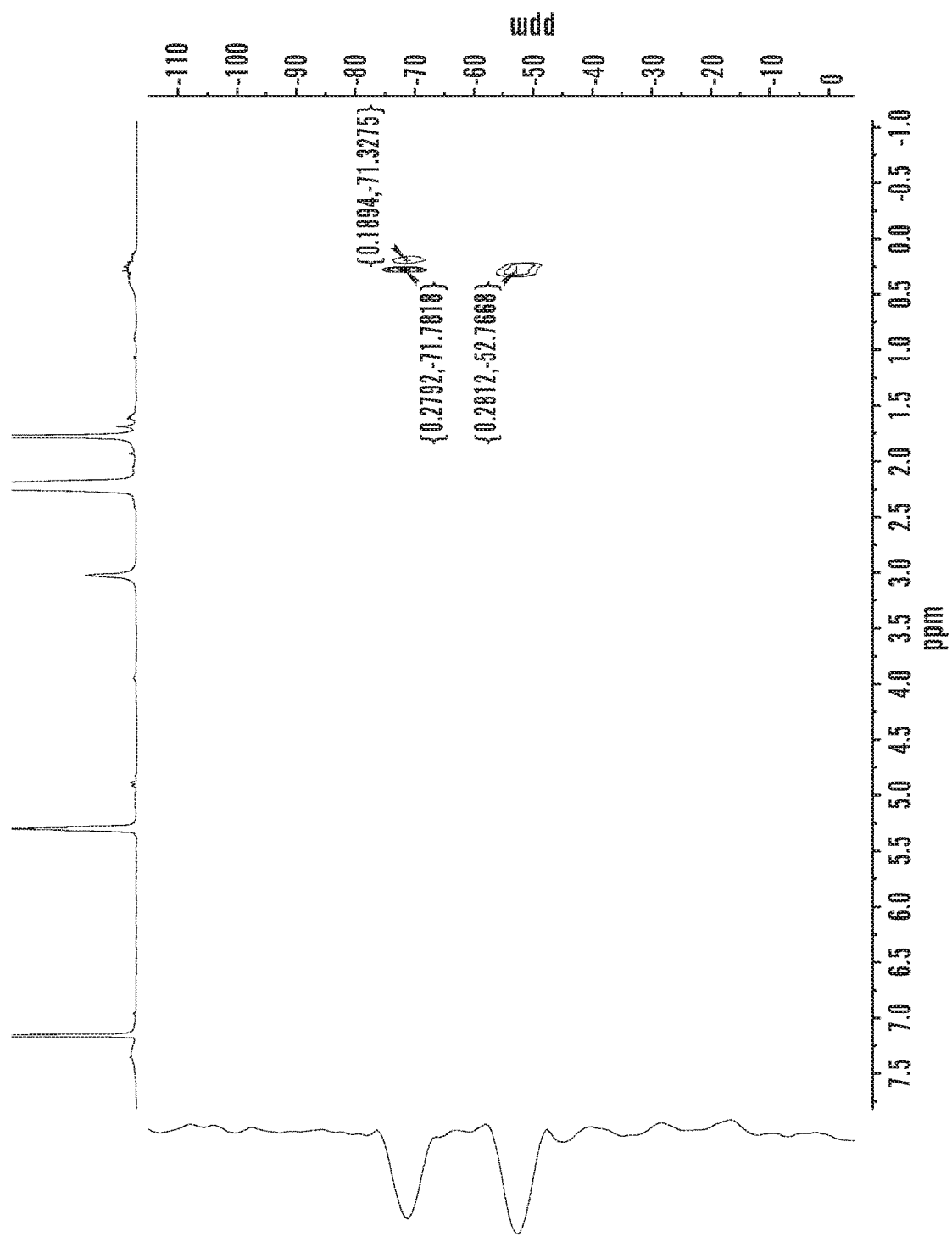
FIG. 11 shows $^{29}Si\{^1H\}$ HMBC NMIR of isolated co-polymer material.
Figure 12:
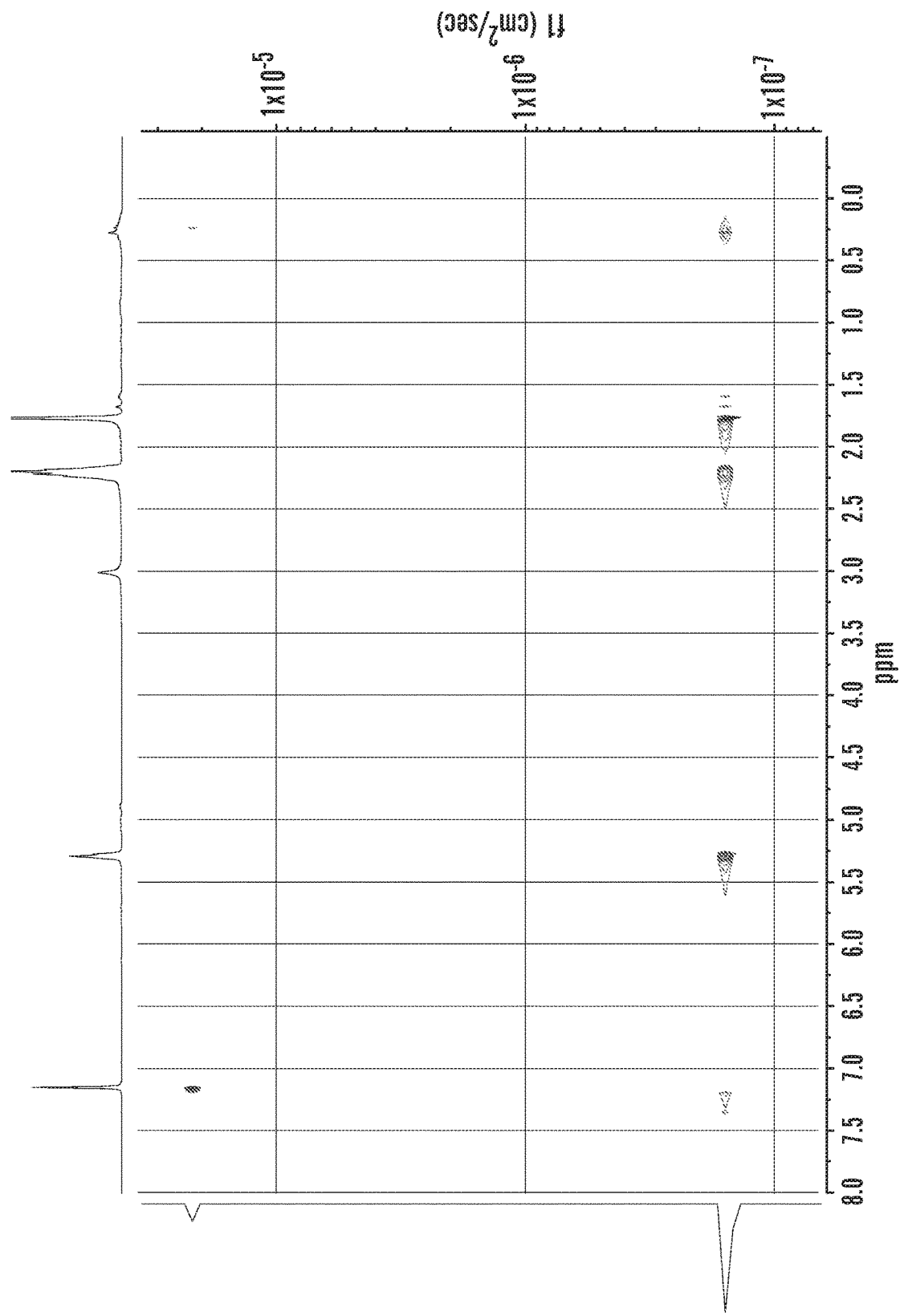
FIG. 12 shows DOSY NMR of isolated co-polymer material.

NdV4 (0.020 g, 0.023 mmol) was stirred with TIBA (0.090 g, 0.920 mmol), DIBAl—H (0.016 g, 0.115 mmol), and DIBAl—Cl (0.006 g, 0.035 mmol) in heptane (20 mL) for 15 minutes to generate a pale-teal solution. Isoprene (1 g, 15 mmol) was added to the solution, and the reaction mixture was stirred for 1 hour. Then, a crude mixture of 2-(Me$_2$NMe$_2$Si)-1,3-butadiene in toluene (~0.3 g in a 3 mL solution also containing deactivated [Ru] catalyst) was added to the reaction mixture, and the mixture was stirred for 1 hour. Methanol was added to quench the polymerization and precipitate the co-polymer. The precipitated polymer was washed with methanol (10×5 mL) to remove small-molecule impurities. $^1$H NMR spectra of the polymer contained upfield SiMe signals, and $^{29}$Si{$^1$H} HMBC experiment showed correlations between Si centers and methyl groups. On the basis of the extensive washing and presence of SiMe signals (FIGS. 10 and 11), we conclude that SiMe groups are covalently bonded to the polyisoprene (end functionalization). The Si—N(iPr)$_2$ were hydrolyzed during work up in methanol, and the $^1$H NMR signal at 3.02 ppm was assigned to a Si—OMe end functional group. DOSY NMR of the material shows peaks associated with polyisoprene (5.3, 2.2, and 1.8 ppm) diffused together as well as peaks containing SiMe signals in the range of 0.0-0.3 ppm (FIG. 12).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A modified polymer having the structure of Formula (I):

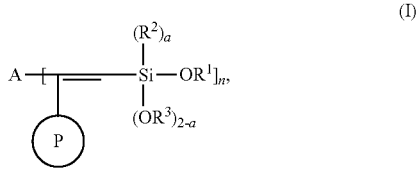

(I)

wherein

is a polymer;

A is selected from the group consisting of

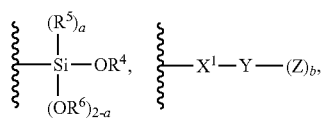

C$_{1-15}$ alkyl, C$_{1-15}$ alkylene, C$_{3-8}$ cycloalkyl, aryl, arylene, and

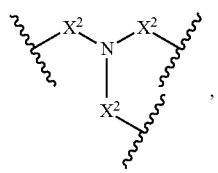

wherein C$_{1-15}$ alkyl, C$_{1-15}$ alkylene, C$_{3-8}$ cycloalkyl, aryl, and arylene can be optionally substituted from 1 to 4 times with a substituent independently selected from the group consisting of H, halogen, C$_{1-6}$ alkyl, and —NR$^7$R$^8$;

is a point of attachment of A to

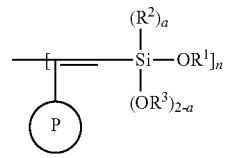

group;

R$^1$ is C$_{1-6}$ alkyl;
R$^2$ is H or C$_{1-6}$ alkyl;
R$^3$ is H or C$_{1-6}$ alkyl;
R$^4$ is C$_{1-6}$ alkyl;
R$^5$ is H or C$_{1-6}$ alkyl;
R$^6$ is H or C$_{1-6}$ alkyl;
R$^7$ is H or C$_{1-6}$ alkyl;
R$^8$ is H or C$_{1-6}$ alkyl;
R$^9$ is C$_{1-6}$ alkyl;
R$^{10}$ is C$_{1-6}$ alkyl;
X$^1$ is C$_{1-6}$ alkylene;
X$^2$ is C$_{1-15}$ alkylene;
Y is O or N;
Z is H, R$^9$, or Si(R$^{10}$)$_3$;
a is 0 to 2;
b is 1 or 2; and
n is 1 to 3.

2. The modified polymer of claim 1, wherein the polymer of Formula (I) has Formula (Ia):

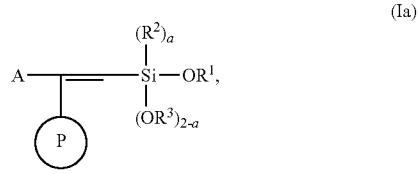

(Ia)

wherein

A is selected from the group consisting of

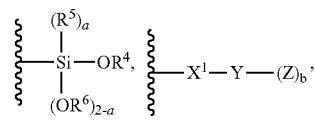

C$_{1-15}$ alkyl, C$_{3-8}$ cycloalkyl, and aryl, wherein C$_{1-15}$ alkyl, C$_{3-8}$ cycloalkyl, and aryl can be optionally substituted from 1 to 4 times with a substituent independently selected from the group consisting of H, halogen, C$_{1-6}$ alkyl, and —NR$^7$R$^8$.

3. The modified polymer of claim 2 having the structure:

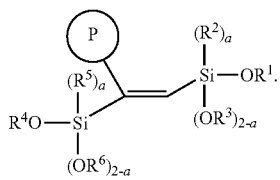

4. The modified polymer of claim 2 having the structure:

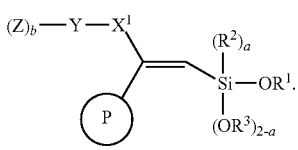

5. The modified polymer of claim 1, wherein the polymer

has a 1,4-cis content of 15 to 99%.

6. The modified polymer of claim 1, wherein the polymer

is a polymer of 1,3-butadiene, isoprene, 2,3-dimethyl-1,3-butadiene, 1,3-pentadiene, 1,3-hexadiene, or myrcene.

7. The modified polymer of claim 1, wherein the polymer

is a polymer of isoprene.

8. A process for polymerizing unsaturated hydrocarbon monomers, said process comprising:
providing unsaturated hydrocarbon monomers;
providing a compound of Formula (II):

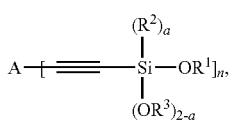 (II)

wherein
A is selected from the group consisting of

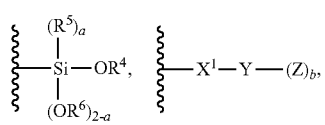

$C_{1-15}$ alkyl, $C_{1-15}$ alkylene, $C_{3-8}$ cycloalkyl, aryl, arylene, and

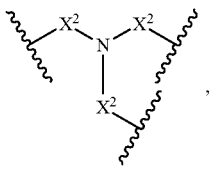, wherein $C_{1-15}$ alkyl, $C_{1-15}$ alkylene, $C_{3-8}$ cycloalkyl, aryl, and arylene can be optionally substituted from 1 to 4 times with a substituent independently selected from the group consisting of H, halogen, $C_{1-6}$ alkyl, and —$NR^7R^8$;

$\overset{\xi}{\underset{\xi}{\lambda}}$ is a point of attachment of A to $$-\!\!=\!\!-\underset{(OR^3)_{2-a}}{\overset{(R^2)_a}{\underset{|}{Si}}}-OR^1]_n$$

group;
$R^1$ is $C_{1-6}$ alkyl;
$R^2$ is H or $C_{1-6}$ alkyl;
$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkylene;
Y is O or N;
Z is H, $R^9$, or $Si(R^{10})_3$;
a is 0 to 2;
b is 1 or 2;
n is 1 to 3; and
providing a catalyst selected from the group consisting of:
(1) a mixture of (A) a compound of Formula $M^1A^1_3$; (B) a halogen containing compound; and (C) an organometallic compound, wherein $M^1$ is a lanthanide metal; $A^1$ is $C_{8-20}$ carboxylate; (2) a mixture of (A) a compound of Formula $M^2(HA^2)A^2_3$; (B) a halogen containing compound; and (C) an organometallic compound, wherein $M^2$ is a lanthanide metal; $A^2$ is $C_{8-20}$ carboxylate; (3) a compound of Formula Li-Alk, wherein Alk is $C_{1-6}$ alkyl; and (4) a compound of Formula (III): $MC(SiHAlk_2)_3(R^{11})_2$ (III), wherein M is a lanthanide or a transition metal; Alk is $C_{1-6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1-6}$ alkyl; and polymerizing the unsaturated hydrocarbon monomers in the presence of the catalyst and the compound of Formula (II) under conditions effective to produce the modified polymer.

9. The process of claim 8, wherein the catalyst is a mixture of (A) a compound of Formula $M^1A^1_3$; (B) a halogen containing compound; and (C) an organometallic compound, wherein $M^1$ is a lanthanide metal; $A^1$ is $C_{8\text{-}20}$ carboxylate.

10. The process of claim 8, wherein the catalyst is a mixture of (A) a compound of Formula $M^2(HA^2)A^2_3$; (B) a halogen containing compound; and (C) an organometallic compound, wherein $M^2$ is a lanthanide metal; $A^2$ is $C_{8\text{-}20}$ carboxylate.

11. The process of claim 8, wherein the catalyst is a compound of Formula Li-Alk, wherein Alk is $C_{1\text{-}6}$ alkyl.

12. The process of claim 8, wherein the catalyst is a compound of Formula (III): $MC(SiHAlk_2)_3(R^{11})_2$ (III), wherein M is a lanthanide or a transition metal; Alk is $C_{1\text{-}6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1\text{-}6}$ alkyl.

13. The process of claim 8, wherein the compound of Formula (II) has Formula (IIa):

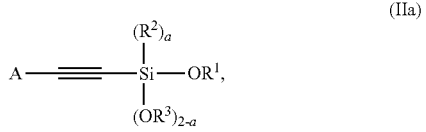

wherein
A is selected from the group consisting of

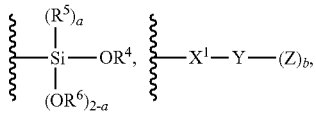

$C_{1\text{-}15}$ alkyl, $C_{3\text{-}8}$ cycloalkyl, and aryl, wherein $C_{1\text{-}15}$ alkyl, $C_{3\text{-}8}$ cycloalkyl, and aryl can be optionally substituted from 1 to 4 times with a substituent independently selected from the group consisting of H, halogen, $C_{1\text{-}6}$ alkyl, and —$NR^7R^8$.

14. The process of claim 13, wherein the compound of Formula (IIa) has the following structure:

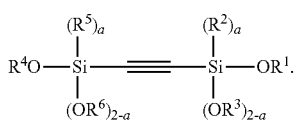

15. The process of claim 13, wherein the compound of Formula (IIa) has the following structure:

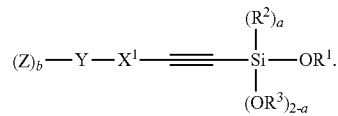

16. The process of claim 8, wherein the modified polymer has 1,4-cis content of 15 to 99%.

17. The process of claim 8, wherein the modified polymer has more than 90% cis-content.

18. The process of claim 8, wherein the modified polymer has a Mooney viscosity of 10 to 100.

19. A process for producing a modified polymer, said process comprising:
providing a polymer;
providing a compound of Formula (II):

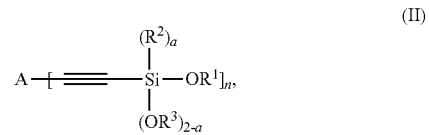

wherein
A is selected from the group consisting of

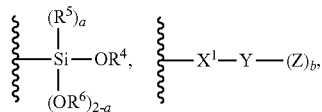

$C_{1\text{-}15}$ alkyl, $C_{1\text{-}15}$ alkylene, $C_{3\text{-}8}$ cycloalkyl, aryl, arylene, and

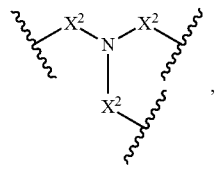

wherein $C_{1\text{-}15}$ alkyl, $C_{1\text{-}15}$ alkylene, $C_{3\text{-}8}$ cycloalkyl, aryl, and arylene can be optionally substituted from 1 to 4 times with a substituent independently selected from the group consisting of H, halogen, $C_{1\text{-}6}$ alkyl, and —$NR^7R^8$;

is a point of attachment of A to

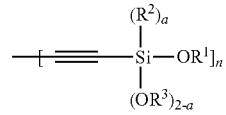

group;
$R^1$ is $C_{1\text{-}6}$ alkyl;
$R^2$ is H or $C_{1\text{-}6}$ alkyl;

$R^3$ is H or $C_{1-6}$ alkyl;
$R^4$ is $C_{1-6}$ alkyl;
$R^5$ is H or $C_{1-6}$ alkyl;
$R^6$ is H or $C_{1-6}$ alkyl;
$R^7$ is H or $C_{1-6}$ alkyl;
$R^8$ is H or $C_{1-6}$ alkyl;
$R^9$ is $C_{1-6}$ alkyl;
$R^{10}$ is $C_{1-6}$ alkyl;
$X^1$ is $C_{1-6}$ alkylene;
$X^2$ is $C_{1-15}$ alkylene;
Y is O or N;
Z is H, $R^9$, or $Si(R^{10})_3$;
a is 0 to 2;
b is 1 or 2;
n is 1 to 3; and
reacting the polymer with the compound of Formula (II) under conditions effective to produce the modified polymer.

20. The process of claim 19, wherein the compound of Formula (II) has Formula (IIa):

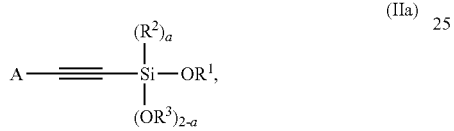

wherein
A is selected from the group consisting of

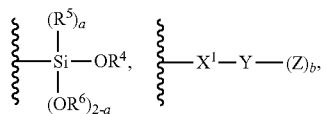

$C_{1-15}$ alkyl, $C_{3-8}$ cycloalkyl, and aryl, wherein $C_{1-15}$ alkyl, $C_{3-8}$ cycloalkyl, and aryl can be optionally substituted from 1 to 4 times with a substituent independently selected from the group consisting of H, halogen, $C_{1-6}$ alkyl, and $-NR^7R^8$.

21. The process of claim 20, wherein the compound of Formula (IIa) has the following structure:

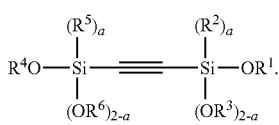

22. The process of claim 20, wherein the compound of Formula (Ia) has the following structure:

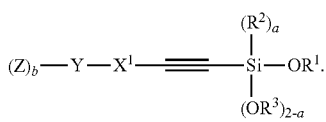

23. The process of claim 19, wherein the polymer has a 1,4-cis content of 15 to 99%.

24. The process of claim 19, wherein the polymer is a polymer of 1,3-butadiene, isoprene, 2,3-dimethyl-1,3-butadiene, 1,3-pentadiene, 1,3-hexadiene, or myrcene.

25. The process of claim 19, wherein the polymer is a polymer of isoprene.

26. A modified polymer prepared by the process of claim 19.

27. A composition comprising:
a modified polymer prepared according to claim 19 and
a filler blended with said modified polymer.

28. The composition of claim 19, wherein the filler is carbon black or silica.

29. A rubber composition comprising:
a natural rubber;
a modified polymer prepared by the process of claim 19; and
a filler.

30. A process for polymerizing unsaturated hydrocarbon monomers, said process comprising:
providing unsaturated hydrocarbon monomers;
providing a compound of Formula (V):

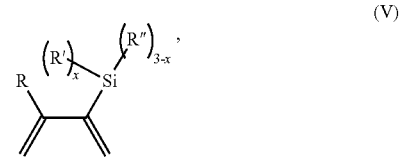

wherein
R is H or $C_{1-6}$ alkyl;
R' is selected from the group consisting of H, $C_{1-6}$ alkyl, $-OC_{1-6}$ alkyl; and $-NR^aR^b$;
R" is H or $C_{1-6}$ alkyl;
$R^a$ is H or $C_{1-6}$ alkyl;
$R^b$ is H or $C_{1-6}$ alkyl; and
x is 0 to 3; and
providing a catalyst which is a mixture of (A) a compound of Formula $M^2(HA^2)A^2_3$; (B) a halogen containing compound; and (C) an organometallic compound, wherein $M^2$ is a lanthanide metal; $A^2$ is $C_{8-20}$ carboxylate; and
polymerizing the unsaturated hydrocarbon monomers in the presence of the catalyst and the compound of Formula (V) under conditions effective to produce the modified polymer.

31. A process for polymerizing unsaturated hydrocarbon monomers, said process comprising:
providing unsaturated hydrocarbon monomers;
providing a compound of Formula (V):

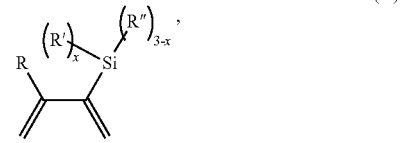

wherein
R is H or $C_{1-6}$ alkyl;
R' is selected from the group consisting of H, $C_{1-6}$ alkyl, $-OC_{1-6}$ alkyl; and $-NR^aR^b$;
R" is H or $C_{1-6}$ alkyl;

$R^a$ is H or $C_{1-6}$ alkyl;

$R^b$ is H or $C_{1-6}$ alkyl; and x is 0 to 3; and providing, as a catalyst, a compound of Formula (III): $MC(SiHAlk_2)_3(R^{11})_2$ (III), wherein M is a lanthanide or a transition metal; Alk is $C_{1-6}$ alkyl; $R^{11}$ is halide, bis(oxazolinato), carboxylate, acetyl acetonate, amidate, alkoxide, amide, $BR^{12}_4$, $AlR^{12}_4$, or alkyl aluminate; $R^{12}$ is independently selected at each occurrence thereof from the group consisting of H, $C_6F_5$, phenyl, and $C_{1-6}$ alkyl; and polymerizing the unsaturated hydrocarbon monomers in the presence of the catalyst and the compound of Formula (V) under conditions effective to produce the modified polymer.

* * * * *